(12) United States Patent
Yonge, III et al.

(10) Patent No.: US 8,090,857 B2
(45) Date of Patent: Jan. 3, 2012

(54) MEDIUM ACCESS CONTROL LAYER THAT ENCAPSULATES DATA FROM A PLURALITY OF RECEIVED DATA UNITS INTO A PLURALITY OF INDEPENDENTLY TRANSMITTABLE BLOCKS

(75) Inventors: Lawrence W. Yonge, III, Ocala, FL (US); Srinivas Katar, Ocala, FL (US); Stanley J. Kostoff, II, Ocala, FL (US); William E. Earnshaw, Ocala, FL (US); Bart W. Blanchard, Fort McCoy, FL (US); Timothy R. Gargrave, Ocala, FL (US)

(73) Assignee: Qualcomm Atheros, Inc., San Jose, CA (US)

( * ) Notice: Subject to any disclaimer, the term of this patent is extended or adjusted under 35 U.S.C. 154(b) by 0 days.

(21) Appl. No.: 10/720,742

(22) Filed: Nov. 24, 2003

(65) Prior Publication Data

US 2005/0114489 A1 May 26, 2005

(51) Int. Cl.
*G06F 15/16* (2006.01)
*H04J 3/16* (2006.01)
(52) U.S. Cl. ........................................ 709/230; 370/469
(58) Field of Classification Search .................. 370/469; 709/250, 230; 714/47, 48
See application file for complete search history.

(56) References Cited

U.S. PATENT DOCUMENTS

| 3,806,885 A | 4/1974 | Moore |
| 4,569,044 A | 2/1986 | Tao et al. |
| 4,581,734 A | 4/1986 | Olson et al. |
| 4,630,261 A | 12/1986 | Irvin |
| 4,677,612 A | 6/1987 | Olson et al. |
| 4,682,324 A | 7/1987 | Ulug |
| 4,720,850 A | 1/1988 | Oberlander et al. |
| 4,726,018 A | 2/1988 | Bux et al. |
| 4,792,947 A | 12/1988 | Takiyasu et al. |
| 4,819,229 A | 4/1989 | Pritty et al. |
| 4,881,241 A | 11/1989 | Pommier et al. |
| 4,943,959 A | 7/1990 | Arnold |

(Continued)

FOREIGN PATENT DOCUMENTS

DE 3413144 10/1985

(Continued)

OTHER PUBLICATIONS

Wha Sook Jeon, Dong Geun Jeong, Chong-Ho Choi, (An Integrated Services MAC Protocol for Local Wireless Communications, Feb. 1, 1998, IEEE Transactions on Vehicular Technology, vol. 47, pp. 352-364).*

(Continued)

*Primary Examiner* — Chirag Patel

(57) ABSTRACT

A method of operating in a network in which a plurality of stations communicate over a shared medium, comprising providing a physical layer (e.g., PHY) for handling physical communication over the shared medium; providing a high level layer (e.g., PAL) that receives data from the station and supplies high level data units (e.g., MSDUs) for transmission over the medium; providing a MAC layer that receives the high level data units from the high level layer and supplies low level data units (e.g., MPDUs) to the physical layer; at the MAC layer, encapsulating content from a plurality of the high level data units; dividing the encapsulated content into a plurality of pieces (e.g., segments) with each piece capable of being independently retransmitted; and supplying low level data units containing one or more of the plurality of pieces.

65 Claims, 11 Drawing Sheets

U.S. PATENT DOCUMENTS

| | | | |
|---|---|---|---|
| 5,001,472 A | 3/1991 | Fischer et al. | |
| 5,003,539 A | 3/1991 | Takemoto et al. | |
| 5,046,069 A | 9/1991 | Calvignac et al. | |
| 5,081,678 A | 1/1992 | Kaufman et al. | |
| 5,105,423 A | 4/1992 | Tanaka et al. | |
| 5,121,396 A | 6/1992 | Irvin et al. | |
| 5,140,584 A | 8/1992 | Suzuki | |
| 5,157,659 A | 10/1992 | Schenkel | |
| 5,197,061 A | 3/1993 | Halbert-Lassalle et al. | |
| 5,214,646 A | 5/1993 | Yacoby | |
| 5,228,025 A | 7/1993 | Le Floch et al. | |
| 5,231,634 A | 7/1993 | Giles et al. | |
| 5,274,629 A | 12/1993 | Helard et al. | |
| 5,280,480 A | 1/1994 | Pitt et al. | |
| 5,307,376 A | 4/1994 | Castelain et al. | |
| 5,339,313 A | 8/1994 | Ben-Michael et al. | |
| 5,343,473 A | 8/1994 | Cidon et al. | |
| 5,384,777 A | 1/1995 | Ahmadi et al. | |
| 5,416,801 A | 5/1995 | Chouly et al. | |
| 5,426,646 A | 6/1995 | Slack | |
| RE35,001 E | 7/1995 | Grow | |
| 5,432,848 A | 7/1995 | Butter et al. | |
| 5,436,905 A | 7/1995 | Li et al. | |
| 5,448,565 A | 9/1995 | Chang et al. | |
| 5,452,288 A | 9/1995 | Rahuel et al. | |
| 5,452,322 A | 9/1995 | Lauer | |
| 5,473,602 A | 12/1995 | McKenna et al. | |
| 5,481,535 A | 1/1996 | Hershey | |
| 5,483,529 A | 1/1996 | Baggen et al. | |
| 5,488,632 A | 1/1996 | Mason et al. | |
| 5,504,747 A | 4/1996 | Sweazey | |
| 5,515,379 A | 5/1996 | Crisler et al. | |
| 5,524,027 A | 6/1996 | Huisken | |
| 5,537,414 A | 7/1996 | Takiyasu et al. | |
| 5,541,922 A | 7/1996 | Pyhalammi | |
| 5,548,649 A | 8/1996 | Jacobson | |
| 5,555,268 A | 9/1996 | Fattouche et al. | |
| 5,563,883 A | 10/1996 | Cheng | |
| 5,563,897 A | 10/1996 | Pyndiah et al. | |
| 5,568,476 A | 10/1996 | Sherer et al. | |
| 5,610,908 A | 3/1997 | Shelswell et al. | |
| 5,612,975 A | 3/1997 | Becker et al. | |
| 5,615,212 A | 3/1997 | Ruszczyk et al. | |
| 5,619,651 A | 4/1997 | Young | |
| 5,623,512 A | 4/1997 | Sasaki | |
| 5,629,948 A * | 5/1997 | Hagiwara et al. | 714/748 |
| 5,636,230 A | 6/1997 | Marturano et al. | |
| 5,644,576 A | 7/1997 | Bauchot et al. | |
| 5,651,009 A | 7/1997 | Perreault et al. | |
| 5,694,389 A | 12/1997 | Seki et al. | |
| 5,706,348 A | 1/1998 | Gray et al. | |
| 5,717,689 A | 2/1998 | Ayanoglu | |
| 5,732,113 A | 3/1998 | Schmidl et al. | |
| 5,737,330 A | 4/1998 | Fulthorp et al. | |
| 5,745,769 A | 4/1998 | Choi | |
| 5,757,766 A | 5/1998 | Sugita | |
| 5,757,770 A | 5/1998 | Lagoutte et al. | |
| 5,764,931 A | 6/1998 | Schmahl et al. | |
| 5,771,235 A | 6/1998 | Tang et al. | |
| 5,787,071 A | 7/1998 | Basso et al. | |
| 5,790,541 A | 8/1998 | Patrick et al. | |
| 5,793,307 A | 8/1998 | Perreault et al. | |
| 5,799,033 A | 8/1998 | Baggen | |
| 5,812,599 A | 9/1998 | Van Kerckhove | |
| 5,818,821 A | 10/1998 | Schurig | |
| 5,818,826 A | 10/1998 | Gfeller et al. | |
| 5,825,807 A | 10/1998 | Kumar | |
| 5,828,677 A | 10/1998 | Sayeed et al. | |
| 5,841,778 A | 11/1998 | Shaffer et al. | |
| 5,841,873 A | 11/1998 | Lockhart et al. | |
| 5,884,040 A | 3/1999 | Chung | |
| 5,886,993 A | 3/1999 | Ruszczyk et al. | |
| 5,892,769 A | 4/1999 | Lee | |
| 5,896,561 A | 4/1999 | Schrader et al. | |
| 5,903,614 A | 5/1999 | Suzuki et al. | |
| 5,914,932 A | 6/1999 | Suzuki et al. | |
| 5,914,959 A | 6/1999 | Marchetto et al. | |
| 5,940,399 A | 8/1999 | Weizman | |
| 5,940,438 A | 8/1999 | Poon et al. | |
| 5,948,060 A | 9/1999 | Gregg et al. | |
| 5,956,338 A | 9/1999 | Ghaibeh | |
| 5,966,412 A | 10/1999 | Ramaswamy | |
| 5,970,062 A | 10/1999 | Bauchot | |
| 5,987,011 A | 11/1999 | Toh | |
| 6,005,894 A | 12/1999 | Kumar | |
| 6,006,017 A | 12/1999 | Joshi et al. | |
| 6,028,933 A * | 2/2000 | Heer et al. | 713/169 |
| 6,041,063 A | 3/2000 | Povlsen et al. | |
| 6,041,358 A | 3/2000 | Huang et al. | |
| 6,044,154 A | 3/2000 | Kelly | |
| 6,044,482 A | 3/2000 | Wong | |
| 6,052,377 A | 4/2000 | Ohmi et al. | |
| 6,076,115 A | 6/2000 | Sambamurthy et al. | |
| 6,092,214 A | 7/2000 | Quoc et al. | |
| 6,097,703 A | 8/2000 | Larsen et al. | |
| 6,098,179 A | 8/2000 | Harter, Jr. | |
| 6,108,713 A | 8/2000 | Sambamurthy et al. | |
| 6,125,150 A | 9/2000 | Wesel et al. | |
| 6,130,887 A | 10/2000 | Dutta | |
| 6,130,894 A | 10/2000 | Ojard et al. | |
| 6,151,296 A | 11/2000 | Vijayan et al. | |
| 6,169,744 B1 | 1/2001 | Grabelsky et al. | |
| 6,182,147 B1 | 1/2001 | Farinacci | |
| 6,188,717 B1 | 2/2001 | Kaiser et al. | |
| 6,192,397 B1 | 2/2001 | Thompson | |
| 6,202,082 B1 | 3/2001 | Tomizawa et al. | |
| 6,215,792 B1 | 4/2001 | Abi-Nassif | |
| 6,216,244 B1 | 4/2001 | Myers et al. | |
| 6,222,851 B1 | 4/2001 | Petry | |
| 6,243,386 B1 | 6/2001 | Chan et al. | |
| 6,243,449 B1 | 6/2001 | Margulis et al. | |
| 6,246,770 B1 | 6/2001 | Stratton et al. | |
| 6,252,849 B1 | 6/2001 | Rom et al. | |
| 6,259,696 B1 | 7/2001 | Yazaki et al. | |
| 6,263,445 B1 | 7/2001 | Blumenau | |
| 6,278,685 B1 | 8/2001 | Yonge, III et al. | |
| 6,278,716 B1 | 8/2001 | Rubenstein et al. | |
| 6,279,716 B1 | 8/2001 | Kayatani et al. | |
| 6,289,000 B1 | 9/2001 | Yonge, III | |
| 6,295,296 B1 | 9/2001 | Tappan | |
| 6,334,185 B1 | 12/2001 | Hansson et al. | |
| 6,343,083 B1 | 1/2002 | Mendelson et al. | |
| 6,363,052 B1 | 3/2002 | Hosein | |
| 6,370,156 B2 | 4/2002 | Spruyt et al. | |
| 6,385,672 B1 | 5/2002 | Wang et al. | |
| 6,397,368 B1 | 5/2002 | Yonge, III et al. | |
| 6,421,725 B1 | 7/2002 | Vermilyea et al. | |
| 6,430,192 B1 | 8/2002 | Creedon et al. | |
| 6,430,661 B1 | 8/2002 | Larson et al. | |
| 6,434,153 B1 | 8/2002 | Yazaki et al. | |
| 6,442,129 B1 | 8/2002 | Yonge, III et al. | |
| 6,445,717 B1 * | 9/2002 | Gibson et al. | 370/473 |
| 6,456,649 B1 | 9/2002 | Isaksson et al. | |
| 6,466,580 B1 | 10/2002 | Leung | |
| 6,469,992 B1 | 10/2002 | Schieder | |
| 6,473,435 B1 | 10/2002 | Zhou et al. | |
| 6,480,489 B1 | 11/2002 | Muller et al. | |
| 6,487,212 B1 | 11/2002 | Erimli et al. | |
| 6,501,760 B1 | 12/2002 | Ohba et al. | |
| 6,519,263 B1 | 2/2003 | Huth | |
| 6,526,451 B2 | 2/2003 | Kasper | |
| 6,538,985 B1 | 3/2003 | Petry et al. | |
| 6,553,534 B2 | 4/2003 | Yonge, III et al. | |
| 6,567,914 B1 | 5/2003 | Just et al. | |
| 6,654,410 B2 | 11/2003 | Tzannes | |
| 6,667,991 B1 | 12/2003 | Tzannes | |
| 6,671,284 B1 | 12/2003 | Yonge, III et al. | |
| 6,747,976 B1 | 6/2004 | Bensaou et al. | |
| 6,765,885 B2 * | 7/2004 | Jiang et al. | 370/328 |
| 6,778,507 B1 | 8/2004 | Jalali | |
| 7,519,030 B2 * | 4/2009 | Cimini et al. | 370/338 |
| 2001/0043576 A1 | 11/2001 | Terry | |
| 2001/0048692 A1 | 12/2001 | Karner | |
| 2002/0001314 A1* | 1/2002 | Yi et al. | 370/469 |
| 2002/0012320 A1 | 1/2002 | Ogier et al. | |
| 2002/0015423 A1* | 2/2002 | Rakib et al. | 370/485 |
| 2002/0042836 A1 | 4/2002 | Mallory | |

| | | | |
|---|---|---|---|
| 2002/0048368 | A1 | 4/2002 | Gardner |
| 2002/0065047 | A1 | 5/2002 | Moose |
| 2002/0131591 | A1* | 9/2002 | Henson et al. .................. 380/44 |
| 2002/0137462 | A1 | 9/2002 | Rankin |
| 2002/0191533 | A1 | 12/2002 | Chini et al. |
| 2003/0006883 | A1 | 1/2003 | Kim et al. |
| 2003/0079169 | A1 | 4/2003 | Ho et al. |
| 2003/0174664 | A1 | 9/2003 | Benveniste |
| 2003/0217182 | A1 | 11/2003 | Liu et al. |
| 2003/0231652 | A1* | 12/2003 | Sprague et al. ............... 370/467 |
| 2003/0231658 | A1* | 12/2003 | Liang et al. .................. 370/469 |
| 2004/0001499 | A1 | 1/2004 | Patella et al. |
| 2004/0008728 | A1* | 1/2004 | Lee .............................. 370/474 |
| 2004/0010736 | A1* | 1/2004 | Alapuranen .................. 714/100 |
| 2004/0047351 | A1* | 3/2004 | Del Prado Pavon et al. ......................... 370/395.4 |
| 2004/0184481 | A1* | 9/2004 | Lee .............................. 370/469 |
| 2005/0053066 | A1* | 3/2005 | Famolari ...................... 370/389 |
| 2005/0063402 | A1* | 3/2005 | Rosengard et al. ........... 370/412 |
| 2005/0089062 | A1* | 4/2005 | Zegelin ........................ 370/463 |
| 2005/0122994 | A1* | 6/2005 | Mangin et al. ............... 370/469 |
| 2005/0135403 | A1* | 6/2005 | Ketchum et al. ............. 370/437 |
| 2008/0132264 | A1* | 6/2008 | Krishnamurthy et al. .... 455/522 |

FOREIGN PATENT DOCUMENTS

| | | |
|---|---|---|
| WO | 98/57440 | 12/1998 |
| WO | WO00/72495 | 11/2000 |
| WO | WO 01/82550 | 11/2001 |
| WO | 02/41598 | 5/2002 |
| WO | WO 02/103943 | 12/2002 |
| WO | WO 2003/100996 | 12/2003 |

OTHER PUBLICATIONS

Wang, Contribution to the TG3 and TG4 MAC: MPDU Formats, May 10, 2001, Wi-LAN Inc., IEEE 802.16 Broadband Wireless Access Working Group <http://ieee802.org/16>.*

Kamerman, A; Aben, G; Net throughput with IEEE 802.11 wireless LANs; Wireless Communications and Networking Conference, 2000. WCNC 2000 IEEE, vol. 2, Sep. 23-28, 2000; pp. 747-752.

Dube, P.; Altman, E.; Queueing analysis of early message discard policy; Communications, 2002. ICC 2002. IEEE International Conference, vol. 4, Iss., 2002, pp. 2426-2430.

U.S. Appl. No. 09/632,303.

Sun et al., Public-key ID-based Cryptosystem, 1991, IEEE, pp. 142-144.

Bruschi, Danilo, Secure Multicast in Wireless Networks of Mobile Hosts: Protocols and Issues, 2002, Mobile Networks and Applications, pp. 503-511.

IBM, Combined use of collision resolution and collision avoidance MAC protocols, Oct. 1, 1994, IBM Technical Disclosure Bulletin, vol. 37, pp. 299-302 (NN9410299).

ISO/IEC 8802-3: 2002 International Standard (ANSI/IEEE Std 802.3) Carrier sense multiple access with collision detection (CSMA/CD) access method and physical layer specifications.

ISO/IEC 8802-11: 1999 International Standard (ANSI/IEEE Std 802.11) Wireless LAN Medium Access Control (MAC) and Physical Layer (PHY) specifications.

Shared Wireless Access Protocol (Cordless Access) Specification, SWAP-CA Revision 1.21, Jan. 27, 1999, by the HomeRF™ Technical Committee.

Interface Specification for HomePNA™ 2.0—10M8 Technology, Dec. 1, 1999.

Interface Specification for HomePNA™ 2.0—10M8 Technology—Link Layer Protocols, Dec. 1, 1999.

Bux, "Token-Ring Local-Area Networks and Their Performance," Procs. Of the IEEE, vol. 77, No. 2, Feb. 1989.

Applied Cryptography, Second Edition: protocols, algorithms, and source code in C, Bruce Schneier, 1996.

PKCS #5 v. 20: Password-Based Cryptography Standard, RSA Laboratories, Mar. 25, 1999.

HomePlug Powerline Alliance, HomePlug 1.0.1 Specification, Dec. 1, 2001.

Lee et al., "HomePlug 1.0 powerline communication LANs—protocol description and performance results", Int. J. Commun. Syst., vol. 16 (2003).

Carrier sense multiple access with collision detection (CSMA/CD) access method and physical layer specifications, ISO/IEC 8802-3: 1996 International Standard (ANSI/IEEE Std 802.3).

Bertsekas et al., Data Networks, Prentice Hall, Englewood Cliffs, NJ, Section 2.4.3 Selective Repeat ARQ (1992).

HiPerformance Radio Local Area Network (HiperLAN) Type I: Functional Specification, European Standard (Telecommunication Series) No. 300652 V. 1.2.1 Jul. 1998.

An Architecture for Differentiated Services, IETF RFC 2475, Dec. 1998.

Goalic et al., "Real-Time Turbo-Decoding of Product Codes on a Digital Signal Processor," IEEE, pp. 624-628 (1997).

Benedetto et al., "A Soft-Input Soft-Output Maximum A Posteriori (MAP) Module to Decode Parallel and Serial Concatenated Codes," TDA Progress Report 42-127, pp. 1-20 (Nov. 1996).

Peterson et al., "Error-Correcting Codes," The MIT Press (1972).

Pyndiah, "Near-Optimum Decoding of Product Codes: Block Turbo Codes," IEEE Transactions on Communications, vol. 46, No. 8, pp. 1003-1010 (Aug. 1998).

Pyndiah, "Near Optimum Decoding of Product Codes," IEEE, pp. 339-343 (1994).

Pyndiah, "Performance of Block Turbo Coded 16-QAM and 64-QAM Modulations," IEEE, pp. 1039-1043 (1995).

Ehrsam et al., "A cryptographic key management scheme for implementing the Data Encryption Standard," IBM Syst J, vol. 17, No. 2 (1978).

Baig, Sobia et al., "A Discrete Multitone Transceiver at the Heart of the PHY Layer of an In-Home Power Line Communication Local Area Network." IEEE Communications Magazine, Apr. 2003, pp. 48-53.

Han Vinck, A.J., "Power Line Communications: State of the Art and Future Trends." IEEE Communications Magazine, Apr. 2003, pp. 34-40.

Supplementary European Search Report in EP application No. EP 04811966, dated Nov. 29, 2010, 4 pages.

Korean Office Action with English Summary of Office Action issued in Korean Application No. 10-2006-7012758, dated Mar. 7, 2011, 5 pages.

* cited by examiner

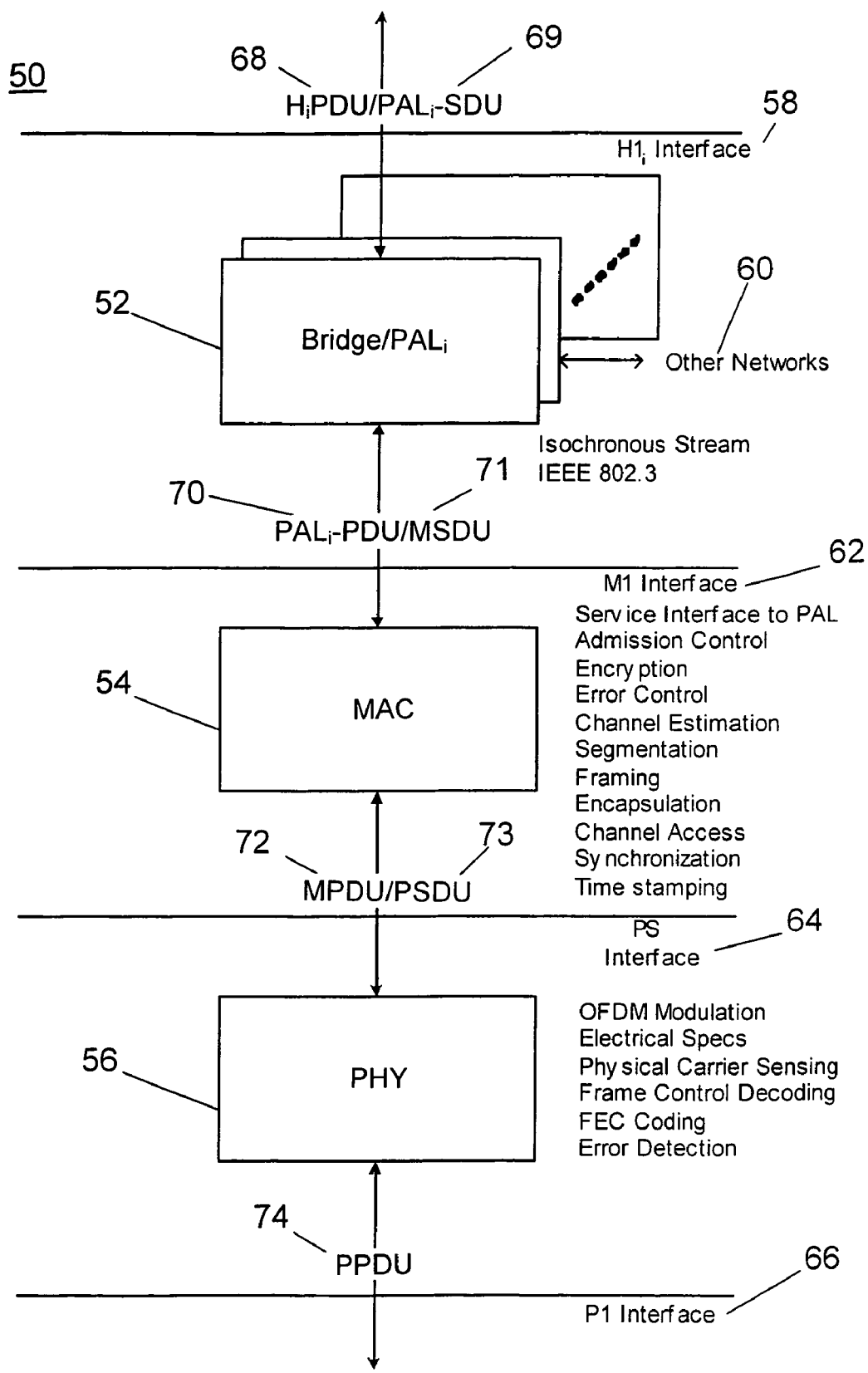
FIG. 2 Reference Network Architecture

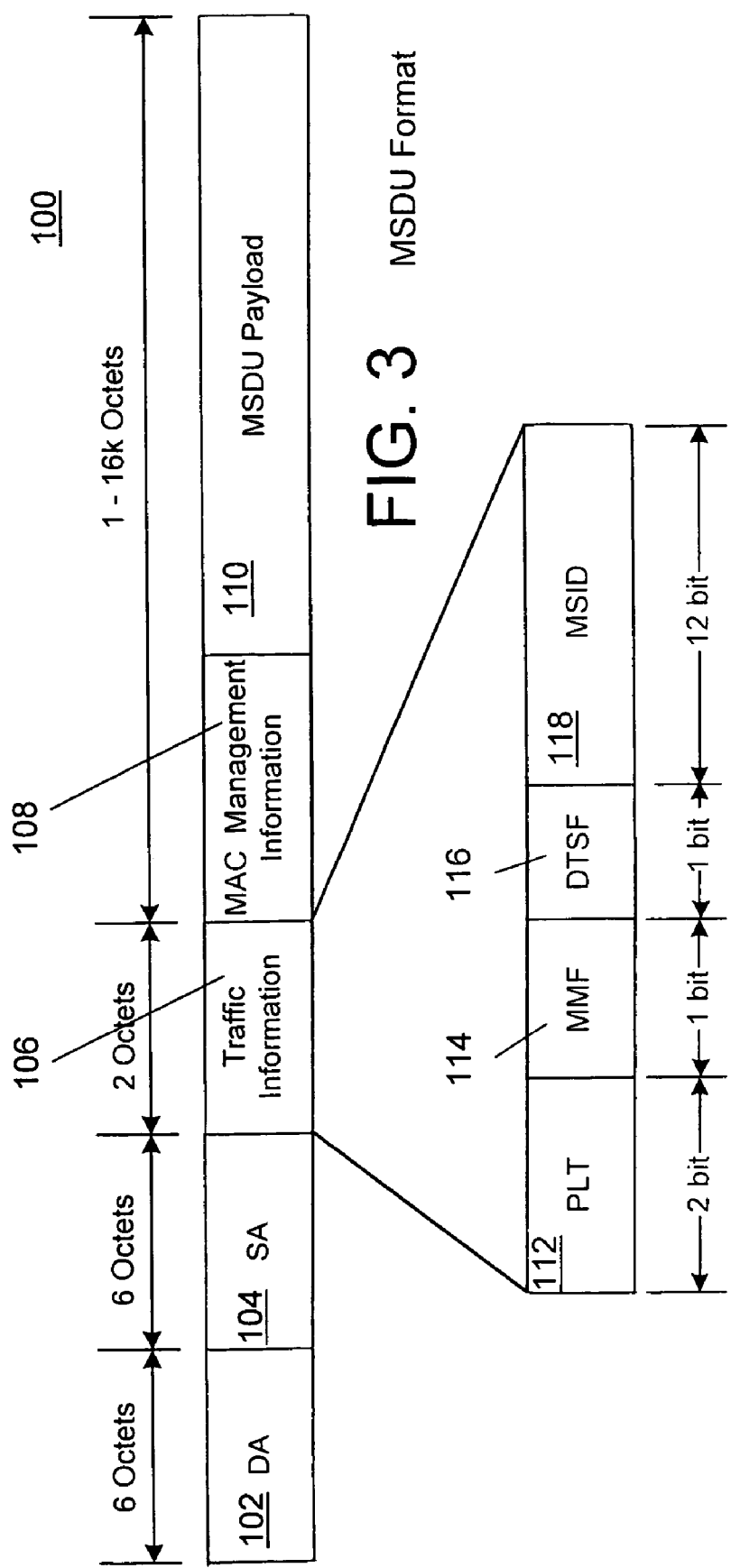
FIG. 3 MSDU Format

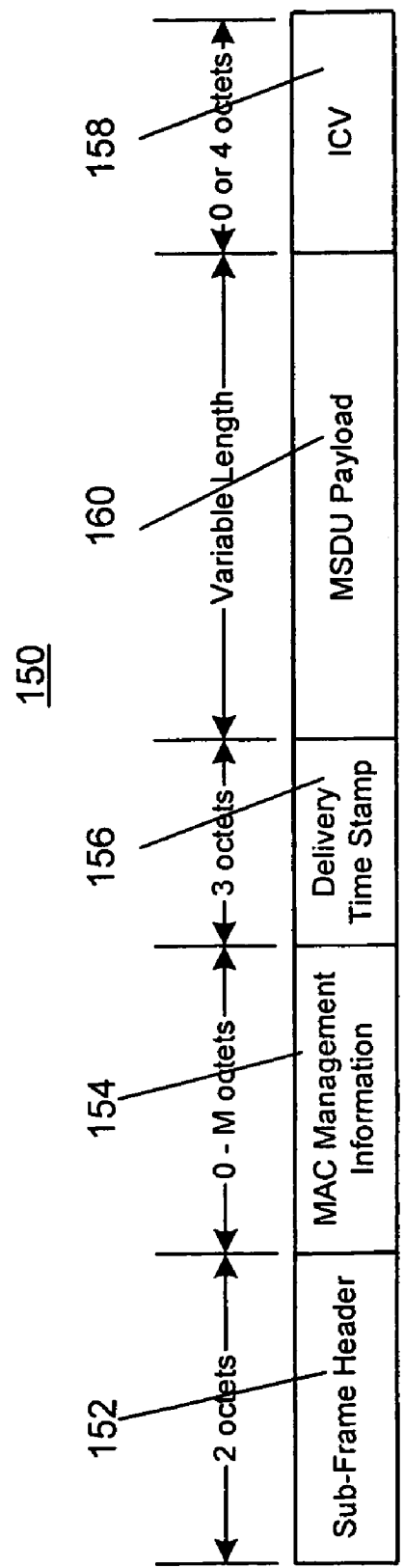
FIG. 4  Sub-Frame
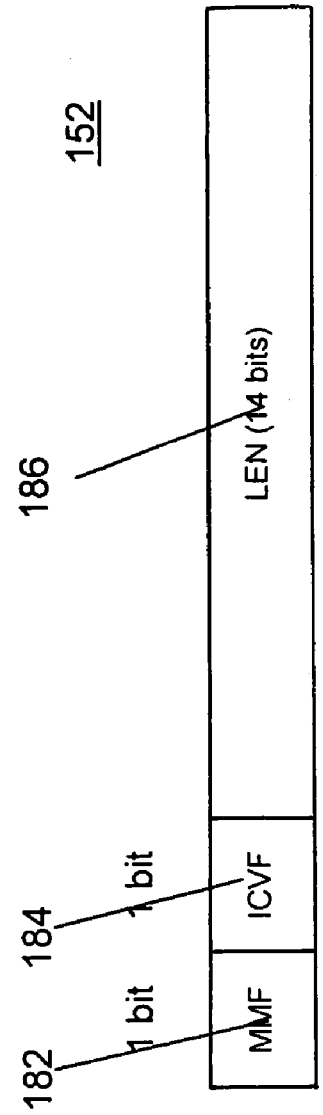
FIG. 5  Sub-Frame Header

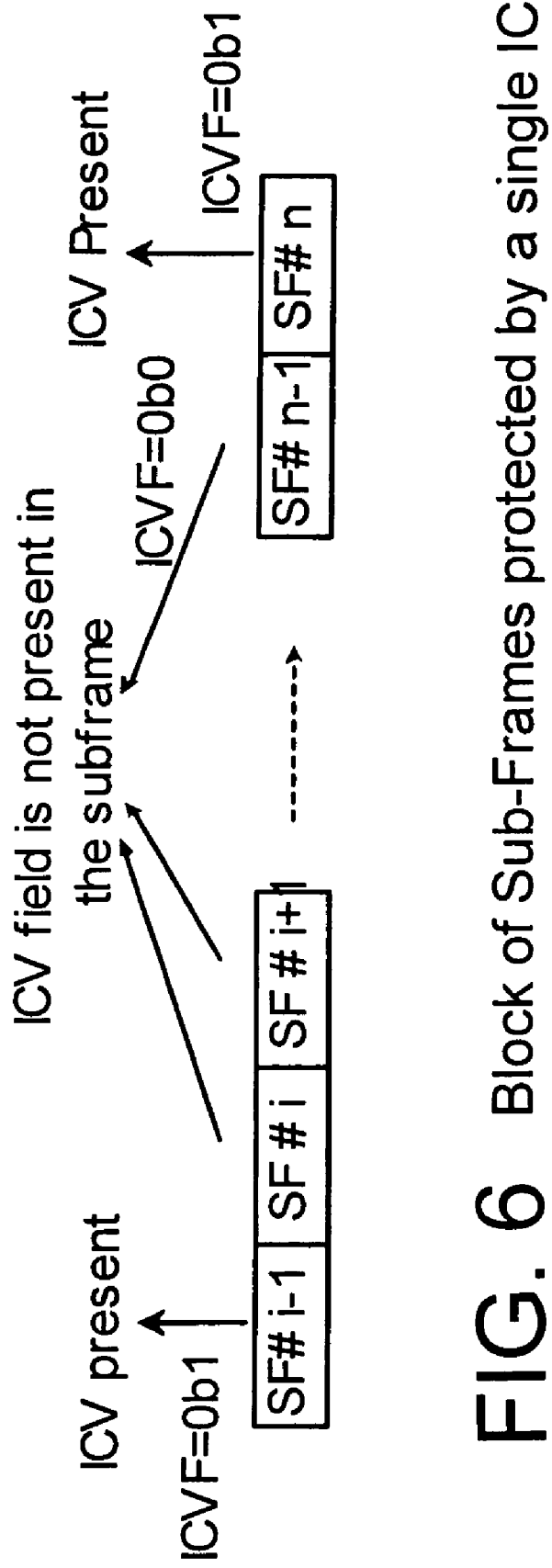
FIG. 6 Block of Sub-Frames protected by a single ICV

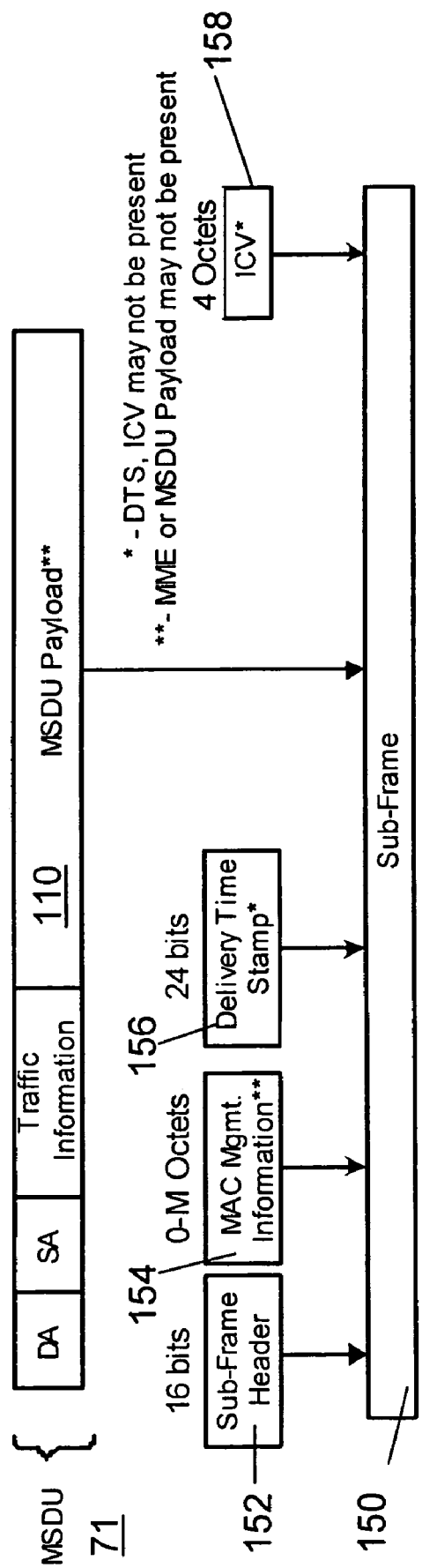
FIG. 7 Sub-Frame generation from a MSDU Payload

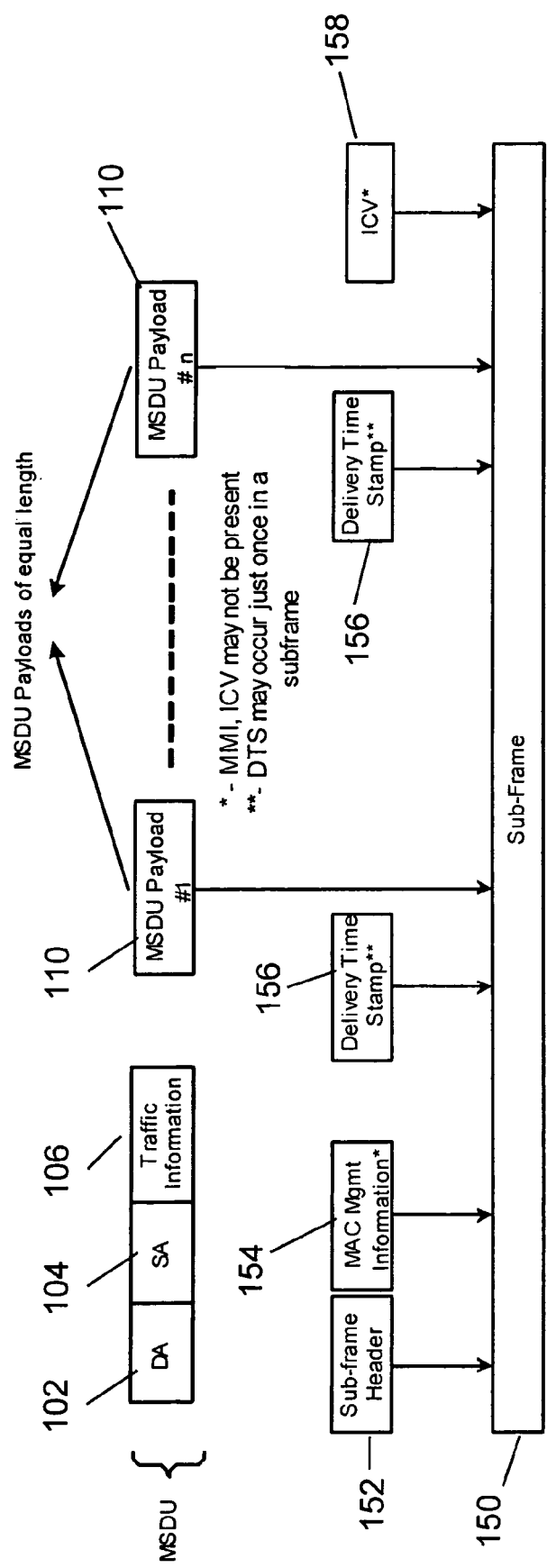
FIG. 8   Sub-Frame generation from multiple MSDU Payloads

MAC ENCAPSULATION

FIG. 10 Generation of MPDU from Sub-Frame Stream

PHY Block Format

MEDIUM ACCESS CONTROL LAYER THAT ENCAPSULATES DATA FROM A PLURALITY OF RECEIVED DATA UNITS INTO A PLURALITY OF INDEPENDENTLY TRANSMITTABLE BLOCKS

TECHNICAL FIELD

This invention relates to network protocols, and more particularly to medium access control layers that encapsulate data from a plurality of received data units.

BACKGROUND

Networking protocols are normally developed in layers, with each layer responsible for a different facet for the communication. Layers exchange structured information. Each layer receives Service Data Units (SDUs) from higher layers, which are processed to generate Protocol Data Units (PDUs). Protocol Data Units are handed over to the lower layers for service. Similarly, the PDUs received from the lower layers are processed to generate SDUs, which are handed over to the higher layers. PDUs not only carry the SDUs but also carry management information that is relevant for managing the layer functionality. Defining the structure of SDUs and PDUs for a given protocol layer is critical to enable proper layer functionality. Some examples of network protocol layers include the well-known Transmission Control Protocol (TCP) and Internet Protocol (IP). The structure of TCP data units has provisions to enable end-to-end delivery. The structure of IP data units enables efficient routing.

Networks use medium access control layer (MAC) to enable coordinated access to the medium. Medium access layer uses the functionality of the physical layer (PHY) to provide services to the higher layer. MAC service to the higher layers can include guarantees on Quality of Service (QoS). QoS provides guarantees on bandwidth, latency, jitter and packet loss probability for traffic streams. Jitter refers to deviation in the time of delivery of data over the network.

SUMMARY

In general, the invention features a method of operating in a network in which a plurality of stations communicate over a shared medium, comprising providing a physical layer (e.g., PHY) for handling physical communication over the shared medium; providing a high level layer (e.g., PAL) that receives data from the station and supplies high level data units (e.g., MSDUs) for transmission over the medium; providing a MAC layer that receives the high level data units from the high level layer and supplies low level data units (e.g., MPDUs) to the physical layer; at the MAC layer, encapsulating content from a plurality of the high level data units; dividing the encapsulated content into a plurality of pieces (e.g., segments) with each piece capable of being independently retransmitted; and supplying low level data units containing one or more of the plurality of pieces.

Preferred implementations of the invention may include one or more of the following. At least some information common to the encapsulated high level data units may not be repeated for each high level data unit encapsulated in a low level data unit. The information common to the encapsulated high level data units may comprise destination and source addresses. The high level data units may each comprise a payload, and encapsulating may comprise forming a queue comprising the payloads from a succession of high level data. The queue may comprise a succession of sub-frames, each sub-frame comprising a header and a plurality of payloads. Each sub-frame may be divided into the plurality of pieces capable of being independently retransmitted. Division of a sub-frame into the plurality of pieces may comprise dividing the sub-frame into a plurality of sub-blocks, and forming at least some pieces from a plurality of sub-blocks. Each piece may constitute a segment that is transmitted as a physical layer block. The invention may further comprise parity pieces derived from other pieces and capable of being used at a destination to recover one or more lost pieces at the destination without having to retransmit the lost pieces. Each piece may be transmitted as a physical layer block, and the parity pieces may also be transmitted as parity physical layer blocks. The physical layer blocks may be encoded using forward error correction. Some of the pieces making up a low level data unit may constitute retransmitted pieces that failed to be correctly transmitted in an earlier attempt. At least some retransmitted pieces may be transmitted with greater forward error correction. Each sub-frame may further comprise a delivery time stamp associated with at least some payloads. Clock information characterizing the time setting of a clock in a transmitting station may be transmitted to a receiving station within a header of the low level data units, and the clock information may be used by the receiving station along with the delivery time stamps to establish the time at which payloads are delivered. The time at which a payload is delivered may be set to be substantially the time specified by the time stamp. The invention may farther comprise an integrity check value associated with each sub-frame or with a plurality of sub-frames. Each of the plurality of payloads in a sub-frame may have identical length. Each sub-frame may further comprise MAC management information. The MAC layer may have the capability of transmitting data in a plurality of sessions within a regularly-repeated contention free interval, wherein a station to which data is transmitted may be identified by a destination address and a station from which data is transmitted may be identified by a source address, and wherein the queue may contain payloads for the same session, same source address, and same destination address. The MAC layer may have the capability of transmitting data in a plurality of sessions within a regularly-repeated contention free interval, wherein a station to which data is transmitted may be identified by a destination address and a station from which data is transmitted may be identified by a source address, and wherein the queue may contain sub-frames for the same session, same source address, and same destination address. The sessions may be transmitted in a substantially contention-free manner. The sessions may be transmitted within time slots of a regularly-repeated contention-free interval. A stream identifier (e.g., MSID) may be used to associate content of a queue with a particular session. The stream identifier may also be used to associate content of a queue with a priority level for contention-based transmission over the medium. There may be a plurality of queues, each containing payloads having a unique combination of stream identifier, source address, and destination address. Each queue may contain a payload having a unique combination of stream identifier, source address, destination address, and type of high level layer. The queue may be divided into a plurality of sub-blocks, wherein a plurality of sub-blocks may be grouped to form a segment, with a segment crossing sub-frame boundaries in the queue, wherein a segment may constitute one of the pieces. Each sub-block may be shorter than a sub-frame. At least some segments may contain a number of sub-blocks corresponding to other than an integral number of sub-frames. The sub-blocks may be of equal length. The sub-blocks may have an associated sequential numbering adapted for use at the receiving station for re-establishing the correct sequential order of the sub-blocks. The sub-blocks may have a predetermined size, which combined with the associated sequential numbering, may eliminate the need for buffer reordering when out of order segments are received. The sub-blocks may be of equal size. The invention may further comprise, for at least some of the low level data units, forming the low level data unit from a plurality of segments. Each segment in the low level data unit may form the body of a separate block transmitted by the physical layer. Individual segments may be individually encrypted. Encryption information common to a plurality of segments may be carried in a header. Some encryption information may be carried in a header and frame control of the low level data unit and in a header of the block. Some encryption information may be carried in frame control of the low level data unit and in a header of the block. Each block may separately undergo forward error correction, and forward error correction bits for each block may be transmitted in the low level data unit. The level of forward error correction used may be different for different blocks. The level of forward error correction used may provide greater error correction capability for selected blocks that are being retransmitted after failing to be correctly transmitted in an earlier attempt. Most of the blocks may be identical in length. The initial and final block of a low level data unit may be of a different length than the remaining blocks. Information common to the plurality of segments forming the low level data unit may be transmitted in a header for the low level data unit. The information common to the plurality of segments may be transmitted only in the header. The low level data unit may further comprise a frame control field.

In another aspect, the invention features a method of operating in a network in which a plurality of stations communicate over a shared medium, comprising providing a physical layer (e.g., PHY) for handling physical communication over the shared medium; providing a high level layer (e.g., PAL) that receives data from the station and supplies high level data units (e.g., MSDUs) for transmission over the medium; providing a MAC layer that receives the high level data units from the high level layer and supplies low level data units (e.g., MPDUs) to the physical layer; at the MAC layer, forming low level data units by encapsulating content from a plurality of the high level data units; and adaptively escalating the robustness of transmission of the low level data units depending on the frequency of transmission errors.

Preferred implementations of the invention may include one or more of the following. The invention may further comprise incorporating forward-error correction information into the transmitted stream of low level data units, and the step of adaptively escalating may comprise adaptively varying the forward-error correction information depending on the frequency of transmission errors. Varying the forward-error correction information may comprise varying one or both of the amount and type of forward-error correction information. Decisions on adaptively escalating may be made at a transmitting station. The low level data units may comprise a plurality of pieces (e.g., segments). The forward error correction information may comprise information associated with provided with the pieces for use at a destination for recovering a piece that is received with errors. The forward error correction information may comprise parity pieces derived from other pieces and capable of being used at a destination to recover one or more lost pieces at the destination without having to retransmit the lost pieces. Each piece may be transmitted as a physical layer block, and the parity pieces may also be transmitted as parity physical layer blocks.

These and other embodiments may have one or more of the following advantages.

The invention provides mechanisms to generate MAC protocol data units (MPDU) from the MAC Service data units (MSDU) in such a manner that enables efficient end-to-end delivery of packets. These mechanisms provide support to enhance Quality of Service (QoS) support and efficient delivery of management information. The format of the MPDU enables efficient retransmission of corrupted data and seamless integration with the underlying physical layer.

Multiple higher layers of the networking protocols can be seamlessly interfaced with the MAC.

The MAC layer provides various Classes of service for application payloads. At the MAC layer, each Class encompasses a coherent set of Quality of Service (QoS) guarantees and can be translated naturally to such behavior in the MAC as channel access, number of retries, etc. This enables scalability and improved QoS guarantees. Supports both connection based and connection less service.

Mechanisms are provided to exchange MAC Management information between MAC layer and higher layers in a manner that would simplify implementation. Several types of MAC Management entities can be defined.

Processing on the MSDUs reduces redundant information while maintaining functionality.

Transmission of management information is enabled in an in-band manner along with application data.

Transmission of urgent MAC management information is enabled in an out-of band manner.

Efficient encryption of information is enabled to provide data privacy.

Testing of end-to-end delivery of MSDUs is enabled by means of a Integrity check vector (ICV).

A segmentation process enables maximum possible MPDUs to generated, thus increasing the MPDU efficiency.

There is a mapping of MPDU on to FEC Blocks at the PHY and the choice of FEC Block sizes enable efficient retransmission.

A MPDU header carries information common to all PBs, thus increasing MPDU efficiency Transmission of MPDUs is enabled with low end-to-end jitter.

Bridging and forwarding of MSDUs are supported.

PHY error detection and correction by means of ARQ process is enabled.

An ARQ process is augmented by an Escalation mechanism and an outer erasure code, which enables improved guarantees on QoS parameters.

There is a simplified reassembly process with duplicate rejection capability. These advantages are illustrated in the Detailed Description of the preferred embodiment that follows.

The details of one or more implementations of the invention are set forth in the accompanying drawings and the description below. Other features, objects, and advantages of the invention will be apparent from the description and drawings, and from the claims.

DESCRIPTION OF DRAWINGS

FIG. 2 is a reference network architecture.
FIG. 3 is a format for a MSDU.
FIG. 4 is a format for a Sub-Frame.
FIG. 5 is a format for a Sub Frame header.
FIG. 6 is a block of Sub-Frames protected by a single ICV.
FIG. 7 is a Sub-Frame generated from a MSDU Payload.

FIG. 8 is a Sub-Frame generated from multiple MSDU Payloads.

DETAILED DESCRIPTION

There are a great many possible implementations of the invention, too many to describe herein. Some possible implementations that are presently preferred are described below. It cannot be emphasized too strongly, however, that these are descriptions of implementations of the invention, and not descriptions of the invention, which is not limited to the detailed implementations described in this section but is described in broader terms in the claims.

Figure 1:
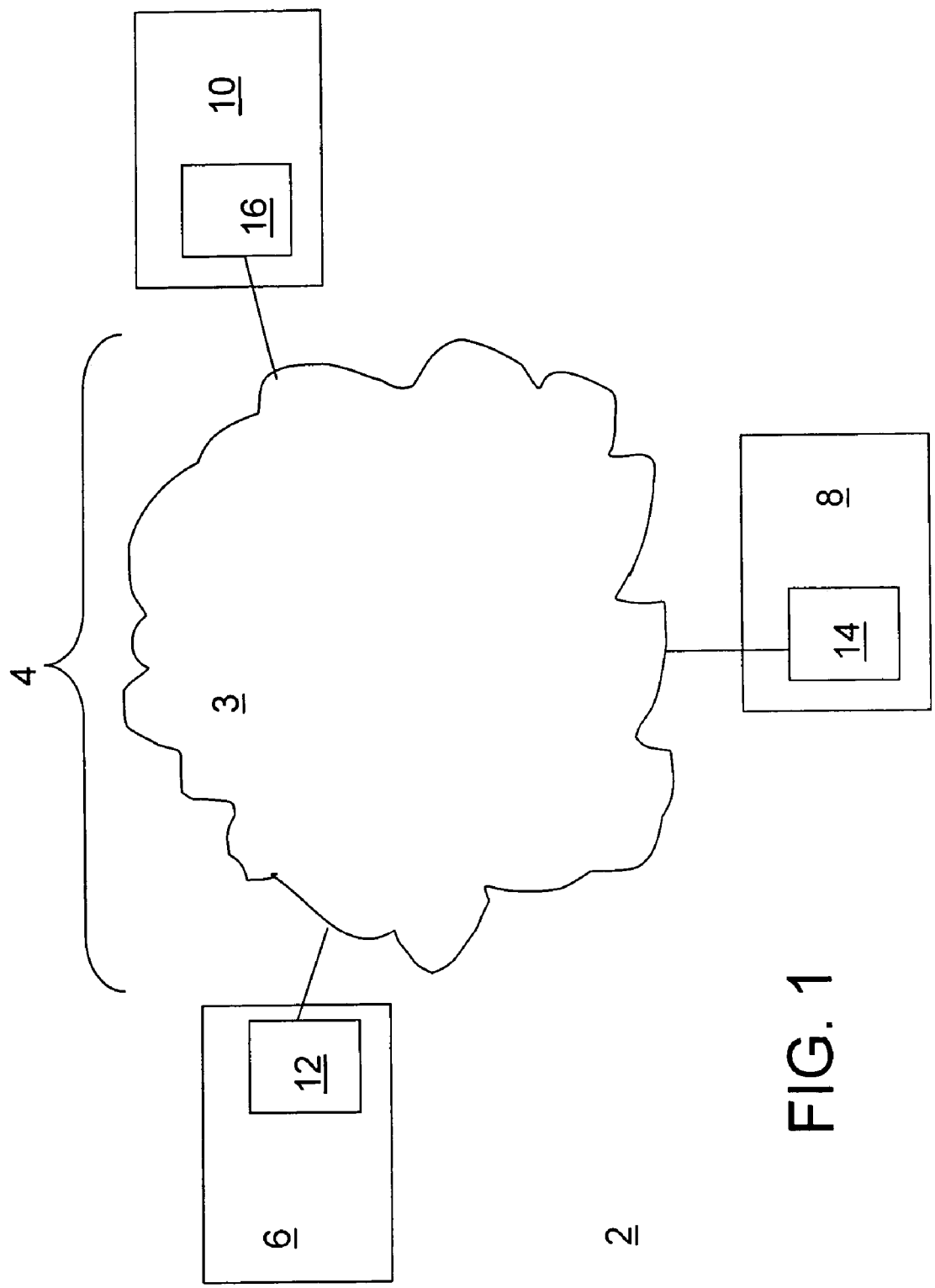
FIG. 1 is a network configuration.

As shown in FIG. 1, network configuration 2 includes communications medium 3 and network 4 in which electronic devices 6, 8, and 10 (e.g., audiovisual equipment) communicate over medium 3. Electronic devices 6, 8, and 10 include media access controllers (MAC) 12, 14, and 16 that manage communication access to the network 4 for electronic devices 6, 8, and 10, respectively. MACs 12, 14, and 16 implement the data link layer and connect to the physical layer (PHY) of the Open Systems Interconnection (OSI) network architecture standard. In a general sense, MACs 12, 14, and 16 represent stations on network 4 that send messages to one another over medium 3. Communications medium 3 is a physical communication link between electronic devices 6, 8, and 10 and may includes optical fiber, coaxial cable, unshielded twisted pair, in addition to other media such as power lines. Electronic devices 6, 8, and 10 communicate with one another based on requirements of software applications running on electronic devices 6, 8, and 10. This communication creates traffic of messages on network 4.

FIG. 2 shows the major system interfaces and their associated data units for a portion of a reference network architecture 50 used by the network configuration 2. This portion may be implemented at each station. The abstract objects that make up the layers of a network system are sometimes called protocols. That is, a protocol provides a communication service that higher-level objects (such as application processes, or higher-level layers) use to exchange messages. Three layers of the network architecture are shown: Bridge/$PAL_i$ 52, MAC 54, and Physical layer (PHY) 56, separated by M1 Interface 62 and PS interface 64, respectively.

$H1_i$ is 58 denotes the $i^{th}$ Host Interface, with one interface for each protocol supported. The H1 interface 58 defines the point of demarcation for the $i^{th}$ Host Protocol Data Units ($H_i$PDU) 68 and the $i^{th}$ Protocol Adaptation Layer Service Data Unit ($PAL_i$ SDU) 69 to higher layers of the network architecture 50.

For each protocol supported, the corresponding Protocol Adaptation Layer (PAL) 52 may be implemented partially in host software and partially in firmware and/or hardware. Examples of architecture 50 support IEEE 802.3 and Isochronous Stream protocols as well as provide access to the proprietary protocols through interface 60. The PAL 52 provides support for Higher Layer Adaptation (HLA) functionality and/or Bridging functionality. Both HLA and Bridging operations support translation of host data packets including PAL Protocol Data Units ($PAL_i$PDU) 70 to MAC Service Data Units (MSDUs) 71 and vice versa, translation of host address from the H1 interface 58 to MAC 12, 14, 16 addresses. HLA and bridging operations also support determination of traffic classes and QoS parameters in addition to Establishment of streams in coordination with the MAC 12, 14, 16.

The PALs 52 also support address discovery and routing functions for bridging operations. Each PAL 52 provides binding and mapping from the stream identifiers provided by the MAC layer 54 at session setup time with the higher layer entities as necessary.

Each PAL 52 has an associated PAL Type (PLT) at the MAC layer 54, to enable routing of the associated MAC Service Data Units (MSDUs) 71 at the receiver MAC (e.g., 12, 14, 16). In addition, information about available overall channel bandwidth as well as available bandwidth for a specific class of traffic is provided by the MAC layer 54 to the PAL 52 to support rate adaptation.

The M1 interface 62 is common to all Protocol Adaptation Layers and defines the demarcation between the PAL 52 and the MAC layer 54, with PAL Protocol Data Units ($PAL_i$PDUs) 70 being passed down from the PAL 52 to the MAC layer 54 as MAC Service Data Units (MSDUs) 72 and vice versa.

The Medium Access Control (MAC) layer 54 processes MAC Service Data Units (MSDUs) 71 from the PAL 52 and generates PHY Service Data Units (PSDU) 73 for delivery to the Physical Layer 56. MAC layer 54 processing includes Service interface to PAL 52, Network Management, Admission Control, Encryption, Error Control (ARQ), Retransmission, Escalation, Channel Estimation—Modulations, FEC, etc., Tone Map as a function of time, Framing, Segmentation & Reassembly, Packet Encapsulation and De-encapsulation, Channel Access (Contention Free Bursting, managed sessions, CSMA/CA, etc.), Time Stamping, Synchronization—With Multimedia Clocks, and Contention Free Sessions.

The Physical Layer Signaling (PS) Interface 64 separates the MAC layer 54 and the PHY 56 with MAC Protocol Data Units (MPDUs) 72 being passed to the PHY 56 from the MAC layer 54 as PHY Service Data Units (PSDUs) 73 across the PS Interface 64 and vice versa.

The Physical Layer (PHY) 56 Protocol provides the following operations. Service interface to MAC layer 54, OFDM Modulation, Forward Error Correction Coding, Physical Carrier Sensing, Frame Control Decoding, Error detection, and information needed for channel estimation and tone map selection.

MSDUs 71 are received by the MAC (e.g., 12, 14, or 16) at the MAC layer 54 from higher layers of the network architecture 50. Details of the format of the MSDUs 71 are described in more detail below. MSDUs 71 arrive either by themselves or in association with a connection. One or more MSDUs 71 are processed by the MAC (e.g., 12, 14, or 16) to produce a Sub-Frame. The term Sub-Frame is used to refer to the data element composed of Sub-Frame Header, optional MAC Management Information, optional Delivery Time Stamp, the Payload from one or more MSDUs 71, and an optional Integrity Check Value (ICV). When a Sub-Frame is generated from multiple MSDUs 71, all MSDU 71 payloads have the same length and have identical SA 104, DA 102, MSID 118, and PLT 112. Grouping of MSDUs 71 into a Sub-Frame is done for efficiency when small fixed length MSDU 71 payloads (such as MPEG Transport Stream packets) are sent in the same stream. The format of the Sub-frame is described in more detail below. Sub-Frames are grouped into Sub-Frame streams. Each sub-frame stream is delivered independently by the MAC (e.g., 12, 14, or 16).

Each MAC 12, 14, 16 supports eight different Classes of services. Each Class encompasses a coherent set of Quality of Service (QoS) characteristics for an application and can be translated naturally to such behavior in the MAC (e.g., 12, 14, 16) as channel access, number of retries, etc. Classes 0 to 3 are used by non-connection oriented MSDUs while Classes 4 to 7 are used by connection oriented services. Each MSDU 71 and hence the corresponding sub-frame stream is associated with a Class. The Sub-Frame can also carry delivery time stamp, which enable support for jitter free delivery of the MSDU 71. Reliable end to end delivery of packets can be confirmed by means of integrity check sequence that can span on or more sub-frames.

Sub-Frames that belong to the same stream are partitioned into Segments and are transmitted as part of a MAC protocol Data Unit (MPDU) 72. Segment and MPDU 72 contents are described in detail below. Segments can be encrypted to provide data privacy. Details of encryption and decryption process are presented in more detail below. Each MPDU 72 contains Frame control information, MPDU header and one or more PHY Blocks (PBs). The Frame Control carries information that is relevant to all stations in the network and is broadcast. MPDU header carries information relevant to all PHY Blocks. The PHY Blocks carry Segments as their payload. Details of the MPDU header and PHY Block are described below. At the physical layer level, each PB is mapped onto a FEC Block except the first PB. The first FEC Block contains MPDU header and the first PB. This mapping of segments onto the FEC blocks at the PHY level enable efficient retransmission as errors at the physical layer occur on granularity of FEC blocks. PHY Blocks contains PB Header and PB integrity check sequence (PBCS). PBCS is used to test the integrity of PB. PB header is used along with the MPDU header for proper reassembly of segments and generation of Sub-Frames.

MPDUs 72 are acknowledged by a receiver layer (e.g., MAC 54) to indicate reception of MPDUs. Segments that cannot be delivered reliable can be retransmitted. Segments in an MPDU 72 can be transmitted in an escalated mode. Escalated Segments are transmitted by the PHY 56 using more robust encoding, thus enabling higher probability of error free delivery. More details on Escalation are provided below. There is interactive use of PHY level 56 escalation and MAC level 54 retransmissions to enable reliable end to end delivery of packets along with QoS enhancements.

MAC Service Data Unit (MSDU)

MAC Service Data Unit (MSDU) 71 is the information payload that the MAC layer 54 has been asked to transport by the higher layer of the network architecture. As shown in FIG. 3, a MSDU format 100 includes a Source Address (SA) 102, a Destination Addresses (DA) 104, a Traffic Information 106, a MAC Management Information 108, and a MSDU Payload 110. The Traffic information field 106 includes a Protocol Adaptation Layer (PAL) Type (PLT) 112, a Delivery Time Stamp Flag (DTSF) 114, a MAC Management Flag (MMF) 116, and a MAC Stream Identifier (MSID) 118.

The salient features of the MSDU format 100 include support for multiple higher layers of the network architecture to interface with the MAC layer 54. Each higher layer of the network architecture 50 is provided with a unique PAL Type 112, which is carried in each MSDU 71 that is generated by the higher layer of the network architecture 50. This enables proper routing of the MSDUs 71 at the receiving MAC layer 54.

The MSDU format 100 also includes support for identifying streams of MSDUs 71 that belong to the same session or require a specific Class of service. This is achieved by means of MAC Stream identifiers (MSID) 118. Sessions can be established by negotiation between the higher layer of the network architecture and the MAC 12. During this process, each session is provided with a unique MSID 118. MSDUs 71 that belong to a session carry the MSID 118 to which each MSDU 71 is associated. In this example, MSIDs 118 enable MAC 12 to use resources allocated for that session, thus providing guarantees on various QoS parameters. A set of MSIDs 118 can be reserved for use by MSDUs 71 that do not belong to any session. In this example, MSID 118 indicates the traffic Class to which the MSDUs 71 belong. Internal to the MAC layer 54, each Class of traffic is provided with a coherent set of access parameters and allocations thus providing differentiated services. In general, established sessions can also be divided into various classes, with each class providing guarantees in a specific range of QoS parameters. In this case, MSID 118 can be used to explicitly determine the traffic Class, which is provided during connection setup.

The format of the MSDU 71 also enables an exchange of MAC Management information between the higher layers of the network architecture 50 and the MAC layer 54 by means of the optional MAC Management field 108. This feature simplifies the interface between the MAC layer 54 and the higher layers of the network architecture. Furthermore, this feature can also be used to exchange management information between higher layers of the network architecture 50.

The MSDU format 100 also provides support for the layer of the network architecture 50 that is higher than the MAC layer 54 to control when a delivery time stamp has to be inserted.

The Destination Address (DA) field 102 and Source Address (SA) field 104 are 6 octets each and carry addressing information between transmitting MAC 12 and receiving MAC 14. An octet is a sequence of eight bits. An octet is thus an eight-bit byte. These fields 102 and 104 are identical to a 48-bit MAC address format described in the Institute of Electrical and Electronics Engineers (IEEE) Standard 802.3.

The 2-octet Traffic Information field 106 contains a 2-bit PAL Type (PLT) field, a 1-bit MAC Management Flag (MMF), a 1-bit DTS Flag, and a 12-bit MAC Stream ID (MSID) field as shown by Table 1.

TABLE 1

| MSDU Traffic Information | | |
| --- | --- | --- |
| Field | Length (bits) | Definition |
| PLT | 2 | PAL Type |
| MMF | 1 | MAC Management Information Flag |
| DTSF | 1 | Delivery Time Stamp Flag |
| MSID | 12 | MAC Stream Identifier |

The PAL Type (PLT) 112 enables the MAC layer 54 to distinguish between various types of higher layers. This is used for proper routing of the MSDU 71 at the receiver layer. MAC layer 54 supports IEEE 802.3 and Isochronous Streams (IS). Table 2 shows the interpretation of the PLT fields.

TABLE 2

| PAL Type | |
| --- | --- |
| PLT Value | Interpretation |
| 0b00 | Ethernet PAL |
| 0b01 | Isochronous Stream |
| 0b10 | Reserved |
| 0b11 | Reserved |

The MAC Management Flag (MMF) 114 is set to 0b1 to indicate that the corresponding MSDU 71 is associated with an embedded MAC Management Information (MMI) field 108.

The Delivery Time Stamp Flag (DTSF) 116 is set to 0b1 by the PAL 52 to indicate that this MSDU payload 110 should be associated with a Delivery Time Stamp in a Sub-Frame that may contain other MSDU payloads 110 that do not have a DTS (as indicated by a DTSF value of 0b0).

The MAC Stream ID (MSID) 118 is a 12-bit field that is associated with the payload being carried by the MSDU 71. MSIDs 118 with values from 0 to 3 are used by MSDUs 71 that do not belong to an established connection and map on to MAC Service Classes 0 to 3. The remaining MSIDs 118 may be used by connection-based services and are assigned by the MAC layer 54 during the connection setup process.

TABLE 3

MAC Stream Identifier

| MSID Value | Interpretation |
| --- | --- |
| 0x000 | Class 0 |
| 0x001 | Class 1 |
| 0x002 | Class 2 |
| 0x003 | Class 3 |
| 0x004-0xfff | Negotiated Stream IDs |

The MSDU format 100 can contain MAC Management Information 108. The presence of this field 108 is indicated by the MMF flag 114 in the Traffic Information field 106. If MAC Management Information 108 is present in the Sub-Frame, its format and content shall be as described in the Jitter Control Section below.

The MSDU Payload field 110 depends on the higher layer (e.g., PAL 52) that generated the MSDU 71. The MSDU Payload 110 is not interpreted by the MAC layer 54.

The Sub-Frame may contain MAC Management Information 108 and no MSDU Payload 110, or a MSDU Payload 110 and no MAC Management Information 108, or it may contain both.

Sub-Frame

The MAC layer 54 processes one or more MSDUs 71 to generate a Sub-Frame. As shown in FIG. 4, a Sub-Frame 150 includes a Sub-Frame Header 152, Optional MAC Management information 154, Optional Delivery time stamp 156, payload 110 from one MSDU and an optional integrity check sequence (ICV) 158. Sub-Frame header 152 contains MAC Management Flag 182, Integrity Check Sequence Flag (ICVF) 184, and Sub-Frame Payload length 186. The format of Sub-Frame 150 is also specified in Table 4.

TABLE 4

Sub-Frame Format

| Field | Length | Definition |
| --- | --- | --- |
| SFH | 2 octets | Sub-Frame Header |
| MAC Management Information | 0-M octets | Optional MAC Management Information |
| DTS | 3 octets | Optional Delivery Time Stamp |
| MSDU Payload | variable octets | Optional MSDU Payload |
| ICV | 4 octets | Optional Integrity Check Value |

As shown in FIG. 5, the Sub-Frame Header 152 is a 2-octet field that carries information about the presence of MAC Management Information and Integrity Check Value (ICV) in the Sub-Frame as well as the length of the Sub-Frame. This information includes MAC Management Flag 182, Integrity Check Value flag 184, and length field 186. The Sub-Frame header is also specified in Table 5.

TABLE 5

Sub-Frame Header

| Field | Length | Definition |
| --- | --- | --- |
| MMF | 1 bit | MAC Management Flag |
| ICVF | 1 bit | ICV Flag |
| LEN | 14 bits | Sub-Frame Length |

The MAC Management Flag 182 is set to 0b1 to indicate the presence of MAC Management information 154. MAC Management information 154, if present, shall follow the sub-frame header 152.

The Integrity Check Value Flag 184 is set to 0b1 to indicate the presence of an ICV field 158 in the corresponding Sub-Frame 150. The ICV field 158, if present, follows the Sub-Frame payload 110.

The Length field 186 is a 14-bit used to specify the length of Sub-Frame 150, excluding the 2-octet Sub-Frame Header 152 and the 4-octet ICV (if present) 158.

The Sub-Frame 150 can contain MAC Management Information 154 as indicated by the MMF flag 182 in the Sub-Frame Header 152. If the MAC Management Information 154 is present in the Sub-Frame 150, its format and content is as described in the Jitter Control Mechanism section below.

The optional Delivery Time Stamp (DTS) 156 is the 24-bit value of the sender's local 25 MHz multimedia clock at the time at which the MSDU 71 arrived from the sender's PAL 52, plus the delivery latency associated with this MSDU 71. This value indicates the time at which the MSDU 71 should be presented to the destination's PAL 52. The DTS field 156 shall be included in a Sub-Frame 150 only when required for jitter control as negotiated at stream set-up. At that time, the option of one DTS 156 per Sub-Frame 150 or one DTS 156 per MSDU payload 110 shall be selected for the stream. The DTS 156 will precede the MSDU payload(s) 110 to which it applies, and these payloads 110 will be grouped according to the DTS Flag 116 in the MSDU traffic information 106. All the MSDUs 100 with DTSF=0b0 will be grouped into a single Sub-Frame 150 with the next MSDU 100 whose DTSF=0b1.

The Sub-Frame Payload field 160 contains the payload 110 from one or more MSDUs 71 depending on how the Sub-Frame 150 was formed.

The Integrity Check Value (ICV) 158 is a Cyclic Redundancy Code (CRC)-32 error checking code computed over one or more Sub-Frames 150. The ICV Flag (ICVF) 158 in the Sub-Frame header 152 is used to determine the Sub-Frames 150 over which the ICV 158 is computed. The ICV 158 does not cover the Sub-Frame headers 152. FIG. 6 shows a block of Sub-Frames 150 protected by a single ICV 158.

Sub-Frames 150 that are generated from MSDUs 71 belonging to the same {SA 104, DA 102, PLT 112 and MSID 118} tuple are grouped together to form a sub-frame stream. When a MPDU 72 is generated by the MAC layer 54, its payload contains Sub-Frame(s) 150 from only one sub-frame stream at a time.

The salient features of Sub-Frame 150, and Sub-Frame Stream generation process include removing information that is common to all the MSDUs 71 that belong to a single stream while a sub-frame 150 is generated. This information is only transmitted once per MPDU 72, thus increasing protocol efficiency.

Multiple MSDU payloads 110 can be transmitted in a single Sub-Frame 150. This improves the protocol efficiency when small fixed length MSDU payloads 110 are sent in the same stream.

The structure of the Sub-Frame 150 provides a mechanism for carrying management information along with MSDU payload 110.

Sub-Frames 150 also provide a mechanism for transmitting delivery time stamps 156. These delivery time stamps 156 provide the time at which the Sub-Frame 150 has to be delivered to the higher layer of the architecture 50 at the receiver MAC (e.g., 12, 14, 16).

The structure of the Sub-Frame 150 allows for inserting an ICV 158 on each Sub-Frame 150 or a group of Sub-Frames 150 at a time. The ICV 158 enables end-to end check for proper reception of Sub-Frames 150.

The Sub-Frame 150 is generated by processing one or more MSDUs 71. The generation of a Sub-Frame 150 from an MSDU 71 is shown in FIG. 7 for the case of a Sub-Frame 150 formed from a single MSDU 71. When a Sub-Frame 150 is generated from multiple MSDUs 71, all MSDU payloads 110 have the same length and belong to an established session. This is done for efficiency when small fixed length MSDU payloads 110 are sent in the same stream. FIG. 8 shows the generation of a Sub-Frame 150 for the case when the Sub-Frame 150 is formed from multiple MSDUs 71.

Sub-Frames Streams, Sub-Blocks and Segments

Figure 9:
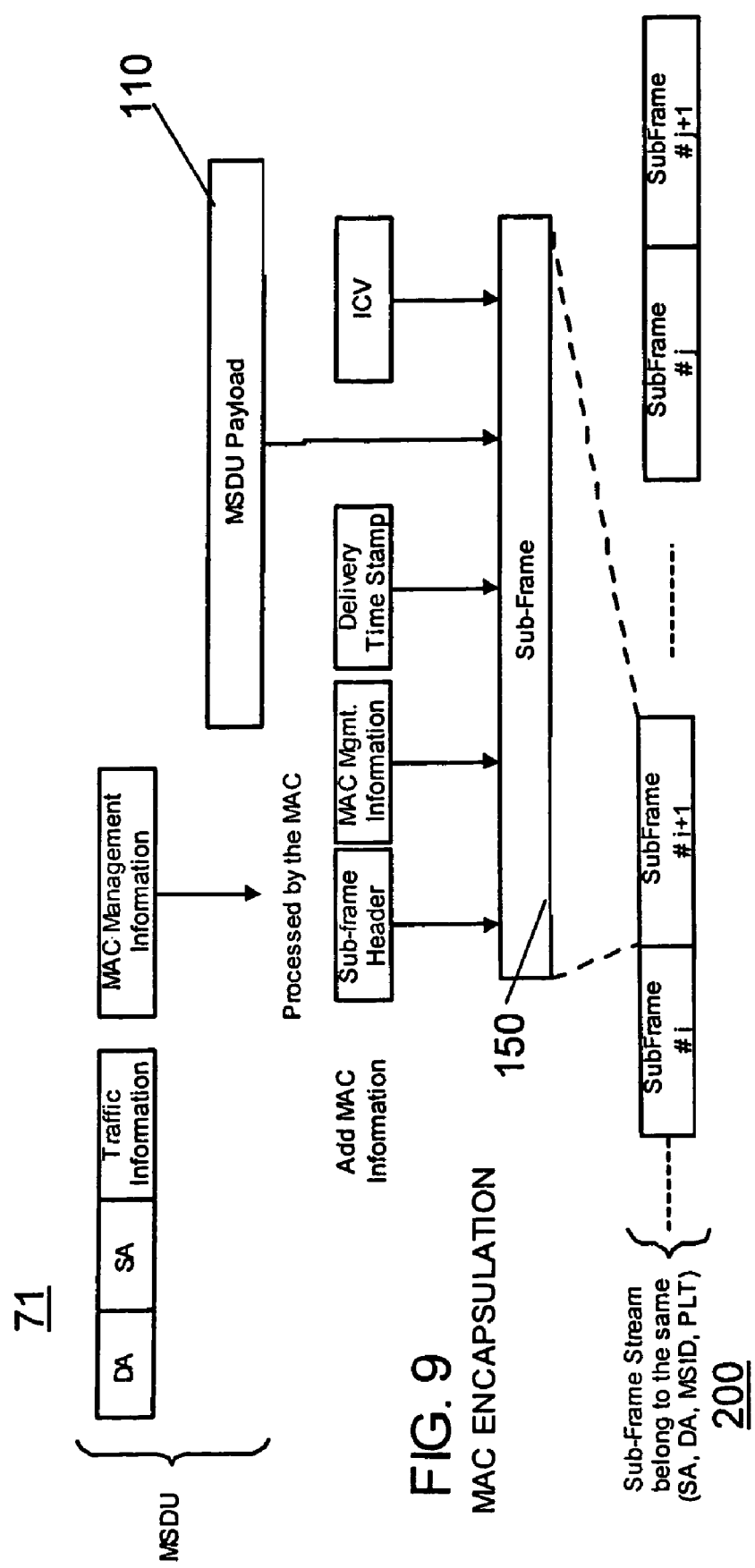
FIG. 9 is a MAC Encapsulation.

As shown in FIG. 9, a Sub-Frame Stream 200 includes Sub-Frames 150 generated from MSDUs 71 that belong to the same {SA, DA, MSID, PLT} tuple. A group of Sub-Frames 150 that are protected by a single Integrity Check Value (ICV) 158 forms an ICV Block, which is the basic entity that is subjected to end-to-end MAC delivery services. This process of generating a Sub-Frame Stream 200 from MSDUs 71 is called encapsulation.

Figure 10:
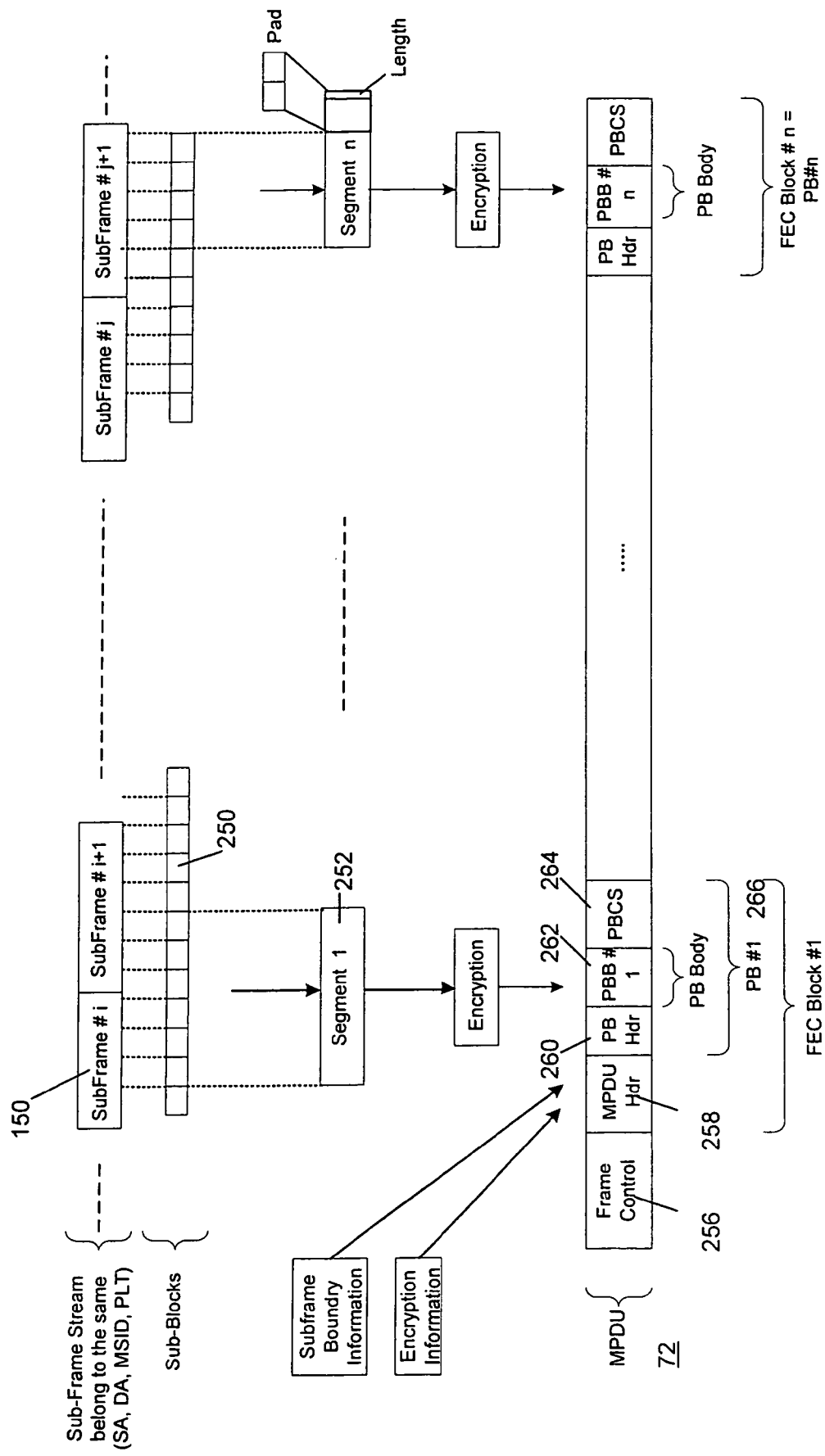
FIG. 10 is a MPDU generated from a Sub-Frame Stream.

As shown in FIG. 10, the Sub-Frame Stream 200 is divided into fixed size Sub-Blocks 250. One or more such Sub-Blocks 250 are then grouped into a Segment 252 to form the basic entity processed by the MAC layer 54 to ensure reliable delivery services. Sub-blocks 250 are numbered entities used for reassembly at the receiver. The Sub-Frame 150 boundary demarcation information is transmitted to the receiver in the MPDU Header. Each segment is padded as necessary, optionally encrypted, and then inserted into a PHY Block (PB) Body. In some examples, padding zeros and a length field are added to a Segment 252 if the buffer is depleted when the Segments 252 are being formed.

MAC Protocol Data Unit (MPDU) and FEC Blocks

The term MAC Protocol Data Unit (MPDU) 254 is the information that the PHY 56 has been asked to transport by the MAC layer 54. The MPDU 72 is composed of a Frame Control field 256, MPDU Header 258 and one or more PHY Blocks 266. Frame Control carriers broadcast information. The MPDU header 258 and the first PHY Block 266 are transmitted using a single FEC Block 268. The subsequent PHY Blocks 266 are transmitted in separate FEC Blocks 266. The first FEC Block 268 in an MPDU 72 is of a larger size to accommodate the fixed length MPDU header 258 along with the PHY Block 266. All the PHY Blocks 266 have a fixed size except for the last one in the MPDU 72.

The salient features of the MPDU format include that all the information that is common to all Segments 252 in an MPDU 72 is transmitted as part of the MPDU header 258, thus improving the efficiency of communication. Furthermore, segmentation across Sub-Frame boundaries provides high MPDU transmission efficiency under a very large range of MSDU, Sub-Frame sizes. The MPDU header 258 is protected by a special integrity check, which provides better performance on marginal channels. The MPDU header 258 carries local clock time stamp information. This time stamp can be used by the receiver MAC (e.g., 14) to synchronize with the transmitter MAC 12, thus enabling jitter free service. The mapping of MPDU header 258 and first PHY Blocks 266 on to the first FEC Block 268 that has a larger size to enable MPDU header 258 overhead enables efficient retransmission of lost PHY Blocks 266. Support for Escalating the PHY Block 266 encoding is provided. This mechanism can be used in conjecture with retransmissions to enhance QoS guarantees. There is also support of Multicast with partial ARQ, bridging and forwarding.

Figure 11:
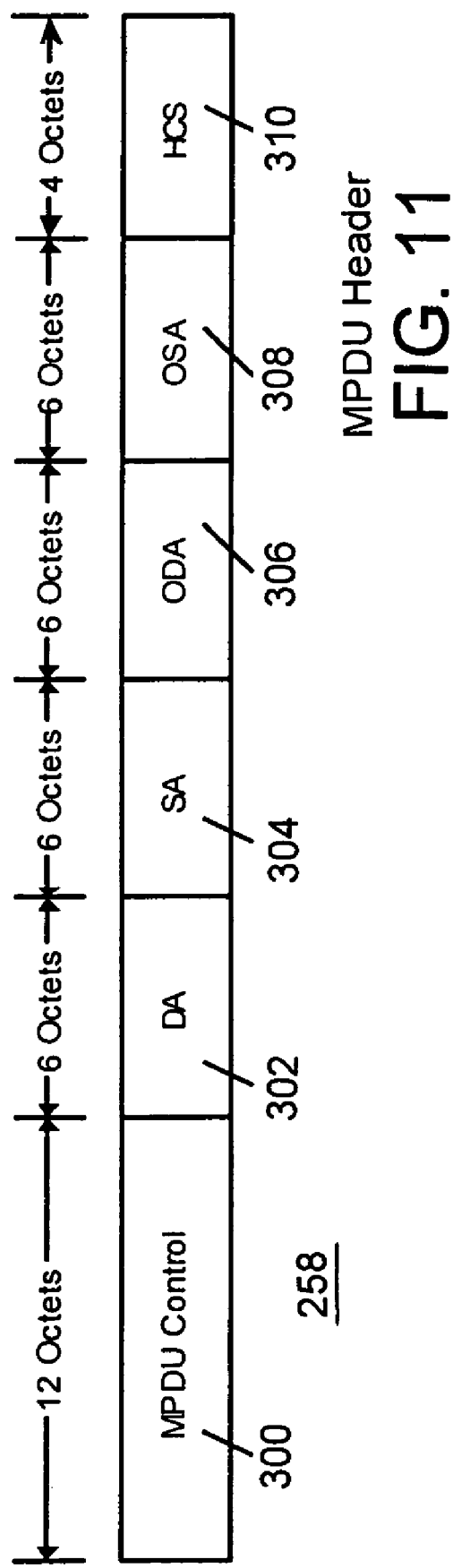
FIG. 11 is a format of a MPDU Header.
Figure 12:
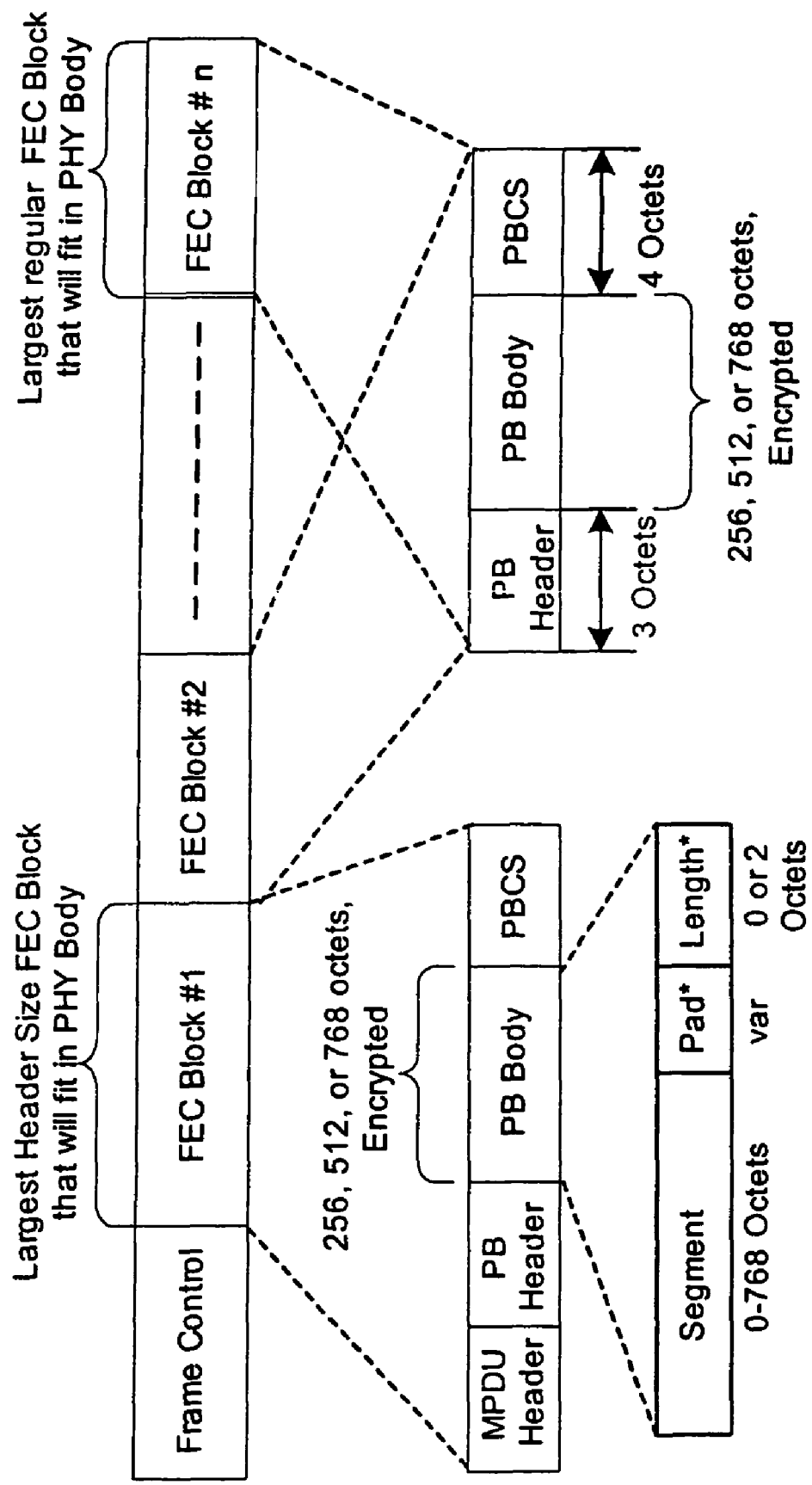
FIG. 12 is a format for a PHY Block.

The format of MPDU Header 258 is shown in FIG. 11. The receiver MAC 14 uses information contained in the MPDU header 258 along with the information in the PB header 260 to decrypt and to reassemble the Sub-Frames 150. The MPDU header 258 includes MPDU Control 300, DA 302, SA 304, ODA 306, OSA 308, and HCS 310. The fields that comprise the 12 octets of the MPDU Control 300 are shown in Table 6.

TABLE 6

MPDU Control Format

| Field | Length (bits) | Definition |
|---|---|---|
| NEPB | 2 | Number of Empty PBs |
| MSID | 12 | MAC Stream ID |
| PLT | 2 | PAL Type |
| TS | 24 | Time Stamp |
| EKS | 12 | Encryption Key Select |
| SFPBN | 6 | Sub-Frame boundary PHY block number |
| SFO | 10 | Sub-Frame boundary offset in PB |

Number of Empty PHY blocks (NEPB) is two bits of the MPDU header which are used to indicate the number of empty PBs 266 at the end of the PPDU Payload. The restrictions on the frame length at high data rates cause increments of as many as 3 FEC blocks between successive valid frame sizes. The sender MAC (e.g., 12) may only require one of these FEC blocks 268 to hold data, and so there may be zero, one, or two empty PBs at the end of the PHY PDU Payload, as indicated by NEPB.

The MAC Stream ID (MSID) field carries the MAC Stream ID that is associated with the payload being carried by this MPDU. MSIDs 0 to 3 are used by MPDUs that carry connectionless Class 0 to 3 traffic respectively. The remaining MSIDs may be used by connection-based services and are assigned by the MAC during the connection setup process.

The PAL Type (PLT) field defines the PAL Type (PLT) that is being carried by the MPDU. The MAC receiver uses this to reassemble and to route the MSDUs to the correct PAL.

The Time Stamp (TS) field is a 24-bit Time Stamp representing the value of the local transmitter's Multimedia clock with reference to the start of the preamble when the MPDU was transmitted. The TS field is used for jitter-free delivery (in conjunction with the Delivery Time Stamp (DTS) in the Sub-Frame Header), Tone Map (TM) timing and in managing the Periodic Contention Free Channel Access.

The Encryption Key Select (EKS) field is an Index of the Encryption Key used for encrypting the Segments. In some examples, EKS is 12 bits long, providing additional keys for access networks. A value of 0x000 indicates that the segments are encrypted using the stations default encryption key. A value of 0xfff indicates that the Segments in the MPDU 72 are not encrypted. Preferred implementations can also obtain the EKS by processing the frame control header fields.

The Sub-Frame Boundary PHY Block Sequence Number (SFPBN) field carries a number representing the relative position within the MPDU of the PHY Block that contains a Sub-Frame boundary. A value of 0b000000 indicates the first PB, 0b000001 indicates the second PB, etc. A value of 0b111111 indicates that no Sub-Frame boundary exists in the current MPDU 72. The Sub-Frame boundary offset (SFO) field carries the offset in bytes of the Sub-Frame boundary (i.e., the first octet of the first new Sub-Frame) within the PHY Block indicated by SFPBN. A value of 0x000 indicates the first byte.

The Destination Address (DA) 302, Source Address (SA) 304, Original Destination Address (ODA) 306, and Original Source Address (OSA) 308 fields carry the addressing associated with the MPDU 72.

The Destination Address (DA) 302 is a 48-bit address for the receiver to which this MPDU 72 is being sent in the current transmission. The address format follows the IEEE 802.3 Ethernet Standard.

The Source Address (SA) 304 is a 48-bit address for the station (e.g., MAC 12) that is sending this MPDU 72 in the current transmission. The address format follows the IEEE 802.3 Ethernet Standard.

The Original Destination Address (ODA) 306 is a 48-bit address for the receiver that is the ultimate destination of this MPDU 254. The address format follows the IEEE 802.3 Ethernet Standard.

The Original Source Address (OSA) 308 is a 48-bit address for the station (e.g., MAC 12) from which this MPDU 72 originated. The address format follows the IEEE 802.3 Ethernet Standard.

The contents of the DA 302, SA 304, ODA 306 and OSA 308 fields in the MPDU header 258 are used to indicate whether the MPDU 72 being transmitted is a Regular MPDU or a Multicast MPDU with Response. Table 7 summarizes the interpretation of these addresses.

blocks. Each PB contains a PB Header (PBH), PB Body (PBB) and PB Check Sequence (PBCS). The MPDU Header is always carried as an addition field pre-pended to the first PB in the MPDU.

The salient features of the PHY Block format include that the PHY Block Check Sequence (PBCS) provides a very highly reliable error detection mechanism. Further mapping of PHY Blocks on to the FEC Blocks enable efficient retransmission.

The PHY Block format also enables the Sub-Block Sequence number to simplify reassembly and provides duplicate rejection at the receiver.

The PHY Block header format also provides a mechanism to transmit MAC Management frame in an out of band manner. This mechanism enables fast exchange of important MAC Management information.

The PHY Block body size is chosen to enable zero encryption overheads in the PHY Block Body. The overall encryption mechanism simplifies implementation.

Three sizes, 263, 519, and 775 octets (with 256, 512, or 768 octets of PBB for the segment it contains, respectively) are supported for PHY blocks 266. However, there are six FEC block information field sizes, namely 263, 519, and 775 octets for FEC Blocks containing only a PHY Block and 303, 559, and 815 octets for FEC Blocks containing a PHY Block and MPDU Header or SMPDU header and VFs field (in SACK long MPDUs). The larger size accommodates an additional 40 Octets for the header and the extra data. The first FEC block in a PPDU contains an MPDU header and a PB, while the rest contain only one PB each. When the PHY Body is filled with FEC blocks that form the PHY Payload, maximum size PBs shall be used for all but the last FEC block, which may contain a PB of any of the three sizes. Subject to these constraints, the sender (e.g., MAC 12) shall fill as much of the PHY Body as possible with PHY Payload.

TABLE 7

ODA, OSA, DA, and SA fields interpretation

| DA | SA | ODA | OSA | Interpretation |
|---|---|---|---|---|
| ODA | OSA | Unicast | Unicast | Regular MPDU |
| not ODA, Unicast | OSA | Unicast | Unicast | Bridged/Forwarded MPDU from the Original Source |
| ODA | not OSA, Unicast | Unicast | Unicast | Bridged/Forwarded MPDU designated to the Original Destination |
| not ODA, Unicast | not OSA, Unicast | Unicast | Unicast | Bridged/Forwarded MPDU between two intermediate stations |
| not ODA, Unicast | Unicast | M/B | Unicast | Multicast or Broadcast MPDU with DA indicating the address of the responder (for partial ARQ) |
| not ODA, unicast | not OSA, Broadcast | Unicast | Unicast | Bridged/Forwarded MPDU with DA indicating the address of the responder (for partial ARQ) and SA indicating the set of station to which the MPDU is intended |

M/B = Multicast/Broadcast

The Header Check Sequence (HCS) is a 32-bit CRC computed over all the MPDU Header fields. After receiving the MPDU, stations shall compute the 32-bit CRC based on the above process to detect transmission errors. If any transmission error is detected, the entire MPDU is discarded. To reduce the probability of errors in the MPDU header, the first FEC Block may be more robustly encoded than the standard FEC block.

Each PHY Block (PB) or PB with MPDU header is mapped onto a single Forward Error Correction (FEC) block at the physical layer. A Long MPDU can carry one or more PHY The fields in the 3-octet PB Header are shown in Table 8.

TABLE 8

PB Header Format

| Field | Length | Definition |
|---|---|---|
| SBSN | 14 bits | Sub-Block Sequence Number |
| PBLT | 2 bits | PB Length Type |
| ECV | 1 bit | Erasure Code Version |

TABLE 8-continued

PB Header Format

| Field | Length | Definition |
|---|---|---|
| EGL | 5 bits | Erasure Group Length |
| PBN | 2 bit | Parity Block Number |

The PB Header consists of a 14-bit Sub-Block Sequence Number and a 2-bit Length Type (PBLT) field, 1-bit Erasure Code Version, 5-bit Erasure Group Length and a 2-bit Parity Block Number.

The Sub-Block Sequence Number (SBSN) field indicates the sequence number of the first Sub-Block in the segment. The SBSN can be used by the receiver to properly insert the received Segments in the reassembly buffer. The process of numbering Sub-Blocks combined with fixed Sub-Block sizes eliminates the need for buffer reordering when out of order segments are received. Dividing the queue into sub-blocks of equal size and sending the sequence number in the PHY Block header simplifies reassembly while reducing the overhead required to carry the sequence number. The overhead is reduced because numbering is done one sub-block at a time rather that one byte (or one bit) at a time. For example, using 256 byte blocks compared to byte number saves 8-bits of space in the PHY block header. Reassembly is simplified because the receiver exactly knows where to put each sub-block.

SBSN numbers shall be initialized to 0 when a CF session is set up, and wrap around as long as the CFID is in use. For non-CF traffic (MSIDs 0-3), it is initialized to 0, wraps around as needed. For CSMA/CA traffic, the last SBSN shall be stored until twice the maximum Sub-Frame lifetime after which the SSBN shall be reset to 0. The first segment with a reset SBSN should have SFPBN=0 and SFO=0 also. When EGL is non-zero (i.e., Parity PB), this field carries the sequence number of the first sub-block in the last segment of the erasure group. The PHY Block Length Type (PBLT) is a 2-bit field that indicates whether the PHY Block Body (PBB) is full, short 1 octet, or short more than 1 octet. The PBLT values and meanings are given in Table 9.

TABLE 9

PBLT Values and Meaning

| PBLT Value | Meaning |
|---|---|
| 0b00 | The PBB is full, all octets are valid |
| 0b01 | The last octet of the PBB is not valid, the segment length is (PBB length − 1) octets (i.e., 767 octets) |
| 0b10 | The segment contained in the PBB is more than 1 octet shorter than the PBB. In this case the last two octets of the PBB form a length field that explicitly gives the segment length in octets.. |
| 0b11 | The segment contained in the PBB is destined for the MAC Management Queue for this {SA, DA} pair. The last two octets of the PBB form a length field that explicitly gives the segment length in octets. |

In the case of PBLT=0b10 or 0b11, the implied 2-octet length field contains the valid data length of the Segment carried by the PBB. The rest of the Segment is zero padded. The PHY Payload length may be large enough to hold more FEC blocks than are required by the MAC, which means that the last FEC block will not hold a PB. In this case, the transmitter inserts an empty PB with the PBLT=0b10 and a length field of 0x00 so that the receiver will discard this PB. The NEPB field of the MPDU Header indicates the number of these PBs so the receiver can discard them without having to decrypt them. When PBLT=0b11, then the receiver reassembles the segment contained in the PBB into the MAC Management Sub-Frame queue associated with this {SA, DA} pair. The MSB of the length field in the PBB of PBs with PBLT=0b11 shall be interpreted as the Sub-Frame Boundary Flag (SFBF). This bit allows the sender to indicate to the receiver that the first octet of the PBB is a sub-frame boundary (when SFBF=0b1).

An Erasure Group Length field when set to 0b00000, indicates a normal PB. A non-zero value of the EGL indicates parity PB. In this case, the value in the EGL field is the number of normal PBs (or the length of erasure group) covered by this parity PB. A value of 0b00001 indicates erasure group of length one and so on. A value of 0b11111 indicates an erasure group of size 31.

A Parity Block Number field is valid only when the EGL is set to a non-zero value. PBN indicates the sequence number of the parity block and is used by the receiver to recover lost segments. This field shall be set to 0b00 for this version The PHY Block (PB) body carries the encrypted Segment as the payload. Note that a Segment may have to be zero-padded before encryption to ensure that it fits exactly into the PB Body. The PB Header and the PBCS are not encrypted.

The PHY Body Check Sequence (PBCS) is a CRC-32 and is computed over the PB Header and the encrypted PB Body. The PBCS of the first PB in an MPDU 72 is not computed over the MPDU header 258.

MAC Management Information Fields

MAC Management Information (MMI) can be transmitted as part of an MSDU or a Sub-Frame. When MMI is transmitted as part of an MSDU, the presence of this field is indicated by setting the MAC Management flag in the Traffic Information to 0b1 (refer to Section 1). When the MMF flag is set, the MMI field immediately follows the end of the Traffic Information. When MMI is transmitted as part of a Sub-Frame, the presence of this field is indicated by setting the MAC Management flag in the Sub-Frame header to 0b1 (Refer to Section 2). When the MMF flag is set, the MAC Management Information field immediately follows the end of the Sub-Frame header. Table 10 shows the structure of the MMI field. Note that the MMI field has variable structure and that the subfields are so defined as to specify the particular structure of the MMI field.

TABLE 10

MAC Management Information Field Format

| Field | Length | Definition |
|---|---|---|
| NE | 1 octet | Number Of MAC Data Entries (L) |
| MEHDR$_1$ | 1 octet | First MAC Management Entry Header |
| MELEN$_1$ | 2 octet | First MAC Management Entry Length (= N$_1$) |
| MMENTRY$_1$ | N$_1$ octets | First MAC Management Entry Data |
| ... | | |
| MEHDR$_i$ | 1 octet | ith MAC Management Entry Header |
| MELEN$_i$ | 2 octet | lth MAC Management Entry Length (= N$_i$) |
| MMENTRY$_i$ | N$_i$ octets | ith MAC Management Entry Data |
| ... | | |
| MEHDR$_L$ | 1 octet | Last MAC Management Entry Header |
| MELEN$_L$ | 2 octet | Last MAC Management Entry Length (= N$_L$) |
| MMENTRY$_L$ | N$_L$ octets | Last MAC Management Entry Data |

The 1-octet Number of Entries (NE) field specifies the number of separate MAC Management Entries that are contained in the MMI field. Supposing that NE is L, then the MMI field contains L structures, one for each MAC Management Entry. Each such structure includes a MAC Management Entry Header (MEHDR), a MAC Management Entry Length (MELEN), and the associated MAC Management Entry data (MMENTRY).

For the $i^{th}$ MMENTRY, the ith MAC Management Entry Header (MEHDR$_i$) field specifies a 1 octet header. The MAC Management Entry Header structure is as shown in Table 11.

TABLE 11

MAC Management Entry Header Field

| Field | Bit Number | Bits | Definition |
|---|---|---|---|
| MEV | 7-6 | 2 | MAC Entry Version |
| METYPE | 5-0 | 6 | MAC Entry Type |

The 2-bit MAC Management Entry Version (MEV) field indicates the version in use for interpretation of MAC Entries. If the received MEV is not equal to 0b00, the receiver discards the MAC Management Entry and uses the MAC entry length field to determine the number of octets to ignore before continuing to process the remainder of the Sub-Frame.

The 6-bit MAC Management Entry Type (METYPE) field defines the MAC entry command or request that follows. Several METYPEs are defined that enables such functions as layer management, Session set up etc.

The MAC Entry Length field (MELEN$_i$) contains the length in octets of the MMENTRY field to follow. If MMENTRY does not exist, MELEN is set to zero. This field provides for transparent extension of MAC management, without rendering older equipment obsolete. If an MSDU or a Sub-Frame is received with an METYPE value that is not understood, the receiver can still properly parse the MSDU or Sub-Frame and process its contents, ignoring what it does not understand. The format of MMENTRY depends on the MEHDR with which it is associated.

Jitter Control Mechanism

A Jitter Control mechanism enables station to deliver MSDUs 71 with a very low jitter in the order of a few nano seconds. This mechanism uses the Delivery time stamp 156 in the Sub-Frames 150 to determine when the corresponding MSDU 71 has to be delivered to the higher layer at the receiver. Synchronization of the clocks of the transmitters (e.g., MAC 12) and receivers (e.g., MAC 14) is obtained by transmitters inserting its local clock time stamp in MPDU header 258 and receiver using this to synchronize with the transmitter.

The salient features of jitter control mechanism include support for very low end-to-end jitter. The jitter control mechanism also includes support for higher layers of the network architecture to control the insertion of Delivery time stamps. This support for higher layers reduces overhead while providing the needed functionality. The jitter control mechanism can also use tracking algorithms to obtain close synchronization with the transmitters clock, thus enabling low end-to-end jitter guarantees in the order of nano-seconds. Furthermore, multi-streaming applications can use jitter control mechanism to provide synchronization between multiple receiver MACs.

Each MAC maintains a 25 MHz System Clock. Any MSDU that belongs to a jitter-free session is associated with a 24-bit Delivery Time Stamp (DTS) when the MSDU arrives at the MAC. This timestamp is inserted into the Sub-Frame that is generated from the MSDU (and possibly other MSDUs). When multiple MSDUs are combined into a single Sub-Frame with a single timestamp, the DTS Flag (DSTF) in the MSDU header indicates which MSDUs are to generate the timestamp. When an MSDU with the DTSF=0b1 arrives, its timestamp is generated and inserted into the Sub-Frame along with the MSDU payload and all other MSDU payloads that arrived since the last MSDU with DTSF=0b1. At the receiver, all of these MSDU payloads are delivered by the time indicated by the DTS in the Sub-Frame, with the last MSDU payload delivered at the indicated time. The PAL sending the MSDUs 71 to the source MAC (e.g., 12) takes care not to exceed the maximum Sub-Frame size before a time stamped MSDU 71 is sent. The DTS is the sum of the system clock value when the MSDU 71 is received plus the end to end latency associated with the traffic (this is determined during the call admission process and the QoS for this traffic type). Every MPDU 72 carries the transmitter's System Clock time stamp (with respect to the start of the preamble) in the MPDU header 258. The receiver may use jitter control algorithm to provide very low jitter guarantees.

The receiving MAC (e.g., 14) delivers jitter-free traffic to the destination PAL at the time indicated in the delivery time stamp (DTS) based on the information derived from the System Clock timestamps in the MPDU headers 258.

ARQ, Escalation, and Erasure Codes

MPDUs 72 are acknowledged by the receiver to indicate reception station. Segments that cannot be delivered reliable can be retransmitted. A retransmitted segment is packaged in a new PB in the front of the next available MPDU 72 and is retransmitted. The retransmitted PBs will normally be escalated to improve their chances of correct reception. The number of escalated PHY Blocks in the MPDU 72 can be indicated in the frame control header. MAC layer can also use parity PBs to ensure reliable delivery of regular PBs. Parity PBs are generated by from a group of regular PBs and can be used to recover one or more lost PBs at the destination without having to retransmit them. These mechanisms enable latency sensitive packets to be delivered more effectively with a limited number of retries. Escalation and Erasure codes tradeoff data rate of the channel with the number of retries required to get a certain packet loss rate.

Encryption

Some implementations allow MACs to transmit segments in an encrypted for, thus providing privacy of data. Encryption information may include an Network Encryption Key (NEK) that indicates the key to be used to decrypt a block and an Initialization Vector (IV) that is used to initialize the decryption algorithm. Both NEK and IV should be correctly known to the receiver to properly decrypt the PB. The Encryption Key Select (EKS) field in the MPDU Header is used to refer to the index of the Network Encryption Key (NEK) used for encryption. The NEK to be used for encrypting any Segment and the corresponding EKS are exchanged between station prior to the transmission of MPDU. The Initialization Vector (IV) used for encrypting the first PHY Block is obtained by concatenating fields from Frame Control, MPDU header and PHY block header. Other preferred implementations may obtain the EKS by processing the fields of the Frame Control. For example, the EKS can be derived from a substantially unique session identifier carried in the Frame Control. The Initialization vector can be generated from the fields of the frame control and the PHY Block header. Once the MPDU is delivered to the destination, the PBCS of each PB is checked and then the good PBs are decrypted and delivered the receiver buffer. PB failures are reported to the transmitting station by a SACK and are re-encrypted and retransmitted, using a current Network Encryption Key (NEK) and a new Initialization Vector (IV). This process reduces the overhead for transmission of initialization vector. Further, proper choice of PHY Block body length can be used to reduce the encryption pad that might be needed.

Other implementations of the invention are within the following claims.

What is claimed is:

1. A method of operating in a network in which a plurality of stations communicate over a shared medium, comprising
providing a physical layer for handling physical communication over the shared medium;
providing a high level layer that receives data from a station and supplies high level data units for transmission over the medium;
providing a MAC layer that receives the high level data units from the high level layer and supplies low level data units to the physical layer;
at the MAC layer, encapsulating content from a plurality of the high level data units into a stream of sub-frames;
dividing the encapsulated stream into a plurality of pieces with each piece capable of being independently retransmitted; and
supplying low level data units, at least some of the low level data units each containing a plurality of the pieces into which the encapsulated stream was divided, and at least some of the low level data units containing boundary demarcation information indicating boundaries between the sub-frames in the stream;
wherein at least some information common to the high level data units is not repeated for each high level data unit encapsulated in the stream;
wherein the high level data units each comprise a payload, and encapsulating comprises forming the stream comprising the payloads from a succession of high level data units;
wherein the stream comprises a succession of sub-frames, each sub-frame comprising a header and a plurality of the payloads;
wherein each sub-frame is divided into the plurality of pieces capable of being independently retransmitted; and
wherein division of a sub-frame into the plurality of pieces comprises dividing the sub-frame into a plurality of sub-blocks, and forming at least some pieces from a plurality of sub-blocks.

2. The method of claim 1 wherein the information common to the high level data units comprises destination and source addresses.

3. The method of claim 1 wherein each piece constitutes a segment that is transmitted as a physical layer block.

4. The method of claim 1 further comprising parity pieces derived from other pieces and capable of being used at a destination to recover one or more lost pieces at the destination without having to retransmit the lost pieces.

5. The method of claim 4 wherein each piece is transmitted as a physical layer block, and the parity pieces are also transmitted as parity physical layer blocks.

6. The method of claim 5 wherein the physical layer blocks are encoded using forward error correction.

7. The method of claim 1 wherein some of the pieces making up a low level data unit constitute retransmitted pieces that failed to be correctly transmitted in an earlier attempt.

8. The method of claim 7 wherein at least some retransmitted pieces are transmitted with greater forward error correction than forward error correction used in the earlier attempt.

9. The method of claim 1 wherein each sub-frame further comprises a delivery time stamp associated with at least some payloads.

10. The method of claim 1 wherein clock information characterizing the time setting of a clock in a transmitting station is transmitted to a receiving station within a header of the low level data units, and the clock information is used by the receiving station along with the delivery time stamps to establish the time at which payloads are delivered.

11. The method of claim 10 wherein the time at which a payload is delivered is substantially the time specified by the time stamp based on information derived from the clock information.

12. The method of claim 1 further comprising an integrity check value associated with each sub-frame or with a plurality of sub-frames.

13. The method of claim 1 wherein each of the plurality of payloads in a sub-frame have identical length.

14. The method of claim 1 wherein each sub-frame further comprises MAC management information.

15. The method of claim 1 wherein the MAC layer has the capability of transmitting data in a plurality of sessions within a regularly-repeated contention free interval, wherein a station to which data is transmitted is identified by a destination address and a station from which data is transmitted is identified by a source address, and wherein the stream contains a queue of payloads for the same session, same source address, and same destination address.

16. The method of claim 1 wherein the MAC layer has the capability of transmitting data in a plurality of sessions within a regularly-repeated contention free interval, wherein a station to which data is transmitted is identified by a destination address and a station from which data is transmitted is identified by a source address, and wherein the queue contains sub-frames for the same session, same source address, and same destination address.

17. The method of claim 15 wherein the MAC layer processes data transmitted in the sessions according to contention-free channel access processing.

18. The method of claim 17 wherein the sessions are transmitted within time slots of a regularly-repeated contention-free interval.

19. The method of claim 15 wherein a stream identifier is used to associate content of a queue with a particular session.

20. The method of claim 19 wherein the stream identifier is also used to associate content of a queue with a priority level for contention-based transmission over the medium.

21. The method of claim 19 wherein there are a plurality of queues of payloads in the stream, each containing payloads having a unique combination of stream identifier, source address, and destination address.

22. The method of claim 21 wherein each queue contains payloads having a unique combination of stream identifier, source address, destination address, and type of high level layer.

23. A method of operating in a network in which a plurality of stations communicate over a shared medium, comprising
providing a physical layer for handling physical communication over the shared medium;
providing a high level layer that receives data from a station and supplies high level data units for transmission over the medium;
providing a MAC layer that receives the high level data units from the high level layer and supplies low level data units to the physical layer;
at the MAC layer, encapsulating content from a plurality of the high level data units into a stream of sub-frames;
dividing the encapsulated stream into a plurality of pieces with each piece capable of being independently retransmitted; and
supplying low level data units, at least some of the low level data units each containing a plurality of the pieces into which the encapsulated stream was divided, and at least some of the low level data units containing boundary demarcation information indicating boundaries between the sub-frames in the stream;
wherein at least some information common to the high level data units is not repeated for each high level data unit encapsulated in the stream;
wherein the high level data units each comprise a payload, and encapsulating comprises forming the stream comprising the payloads from a succession of high level data units;
wherein the stream comprises a succession of sub-frames, each sub-frame comprising a header and a plurality of the payloads; and
wherein the stream is divided into a plurality of sub-blocks, wherein a plurality of sub-blocks are grouped to form a segment, with a segment crossing sub-frame boundaries in the stream, wherein a segment constitutes one of the pieces.

24. The method of claim 23 wherein each sub-block is shorter than a sub-frame.

25. The method of claim 23 wherein at least some segments contain a number of sub-blocks corresponding to one or more sub-frames including at least one sub-frame whose associated sub-blocks comprise less than the whole sub-frame.

26. The method of claim 23 wherein the sub-blocks are of equal length.

27. The method of claim 23 wherein the sub-blocks have an associated sequential numbering adapted for use at the receiving station for re-establishing the correct sequential order of the sub-blocks.

28. The method of claim 27 wherein the sub-blocks have a predetermined size, which combined with the associated sequential numbering, eliminates the need for buffer reordering when out of order segments are received.

29. The method of claim 28 wherein the sub-blocks are of equal size.

30. The method of claim 23 further comprising, for at least some of the low level data units, forming the low level data unit from a plurality of segments.

31. The method of claim 30 wherein each segment in the low level data unit forms the body of a separate block transmitted by the physical layer.

32. The method of claim 30 wherein individual segments are individually encrypted.

33. The method of claim 32 wherein encryption information common to a plurality of segments is carried in a header.

34. The method of claim 33 wherein some encryption information is carried in a header and frame control of the low level data unit and in a header of the block.

35. The method of claim 32 wherein some encryption information is carried in frame control of the low level data unit and in a header of the block.

36. The method of claim 31 wherein each block separately undergoes forward error correction, and forward error correction bits for each block are transmitted in the low level data unit.

37. The method of claim 36 wherein the level of forward error correction used is different for different blocks.

38. The method of claim 37 wherein the level of forward error correction used provides greater error correction capability for selected blocks that are being retransmitted after failing to be correctly transmitted in an earlier attempt.

39. The method of claim 31 wherein most of the blocks are identical in length.

40. The method of claim 39 wherein the initial and final block of a low level data unit can be of a different length than the remaining blocks.

41. The method of claim 30 wherein information common to the plurality of segments forming the low level data unit is transmitted in a header for the low level data unit.

42. The method of claim 36 wherein the information common to the plurality of segments is transmitted only in the header.

43. The method of claim 36 wherein the low level data unit further comprises a frame control field.

44. The method of claim 1, further comprising adaptively escalating the robustness of transmission of at least some of the pieces in each of at least some of the low level data units depending on the frequency of transmission errors.

45. The method of claim 44 wherein
the method further comprises incorporating forward-error correction information into the transmitted stream of low level data units, and
wherein the step of adaptively escalating comprises adaptively varying the forward-error correction information depending on the frequency of transmission errors.

46. The method of claim 45 wherein varying the forward-error correction information comprises varying one or both of the amount and type of forward-error correction information.

47. The method of claim 44 wherein decisions on adaptively escalating are made at a transmitting station.

48. The method of claim 44 wherein each of the low level data units contains a plurality of the pieces.

49. The method of claim 47 wherein the forward error correction information comprises information associated with the pieces for use at a destination for recovering a piece that is received with errors.

50. The method of claim 47 wherein the forward error correction information comprises parity pieces derived from other pieces and capable of being used at a destination to recover one or more lost pieces at the destination without having to retransmit the lost pieces.

51. The method of claim 50 wherein each piece is transmitted as a physical layer block, and the parity pieces are also transmitted as parity physical layer blocks.

52. A method of operating in a network in which a plurality of stations communicate over a shared medium, comprising
providing a physical layer for handling physical communication over the shared medium;
providing a high level layer that receives data from a station and supplies high level data units; and
providing a layer that receives the high level data units from the high level layer and supplies low level data units to the physical layer;
wherein supplying the low level data units comprises
encapsulating content from a plurality of the high level data units into a stream of sub-frames,
dividing the encapsulated stream into a plurality of sub-blocks,
forming a plurality of pieces, with each piece including one or more sub-blocks, to provide pieces capable of being independently retransmitted, and
supplying low level data units, at least some of the low level data units each containing a plurality of the pieces that include the sub-blocks into which the encapsulated content was divided, and at least some of the low level data units containing boundary demarcation information indicating boundaries between the sub-frames in the stream.

53. The method of claim 52 wherein a plurality of the plurality of pieces each include a same number of the sub-blocks.

54. The method of claim 52 wherein at least one of the plurality of pieces includes one or more sub-blocks and padding.

55. The method of claim 54 wherein an amount of padding in a piece is selected based on the number of sub-blocks in the piece and the size of the pieces.

56. The method of claim 52 wherein the high level data units each comprise a payload, and encapsulating comprises forming the stream comprising the payloads from a succession of high level data units.

57. The method of claim 56 wherein the stream comprises a succession of sub-frames, each sub-frame comprising a header and a plurality of the payloads.

58. The method of claim 57 wherein each sub-frame is divided into the plurality of pieces capable of being independently retransmitted.

59. The method of claim 58 wherein division of a sub-frame into the plurality of pieces comprises dividing the sub-frame into the plurality of sub-blocks of equal size, and forming at least some pieces from a plurality of sub-blocks.

60. The method of claim 1 wherein the boundary demarcation information for a given low level data unit comprises information that indicates whether a boundary between sub-frames exists within the low level data unit.

61. The method of claim 60 wherein, if such boundary does exist within the low level data unit, the boundary demarcation information further comprises information that indicates where the boundary occurs within the low level data unit.

62. The method of claim 61 wherein the information that indicates whether a boundary between high level data units exists within the low level data unit comprises a field having a value that indicates which piece in the low level data unit includes the boundary, or having a value that indicates that no boundary exists within the low level data unit.

63. The method of claim 62 wherein the information that indicates where the boundary occurs within the low level data unit comprises an offset indicating a relative position of the boundary within the piece including the boundary.

64. The method of claim 62 wherein the field is a header associated with the low-level data unit.

65. The method of claim 1 wherein at least one of the low-level data units contains a portion of at least one sub-frame, and at least one of the low-level data units contains a different portion of the at least one sub-frame.

* * * * *